(12) United States Patent
Damnjanovic et al.

(10) Patent No.: US 10,091,788 B2
(45) Date of Patent: Oct. 2, 2018

(54) TECHNIQUES FOR CONTENTION WINDOW ADJUSTMENT FOR TRANSMISSIONS IN A SHARED RADIO FREQUENCY SPECTRUM BAND

(71) Applicant: QUALCOMM Incorporated, San Diego, CA (US)

(72) Inventors: Aleksandar Damnjanovic, Del Mar, CA (US); Qingsi Wang, San Diego, CA (US); Maarten Menzo Wentink, Naarden (NL); Marco Papaleo, Nuremberg (DE); Srinivas Yerramalli, San Diego, CA (US); Onkar Jayant Dabeer, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 15/230,042

(22) Filed: Aug. 5, 2016

(65) Prior Publication Data
US 2017/0048860 A1 Feb. 16, 2017

Related U.S. Application Data

(60) Provisional application No. 62/203,313, filed on Aug. 10, 2015.

(51) Int. Cl.
*H04W 72/04* (2009.01)
*H04W 74/02* (2009.01)
(Continued)

(52) U.S. Cl.
CPC ....... *H04W 72/0453* (2013.01); *H04L 5/0007* (2013.01); *H04W 16/14* (2013.01);
(Continued)

(58) Field of Classification Search
CPC ........ H04W 72/0453; H04W 74/0808; H04W 16/14; H04W 88/02; H04L 5/0007
(Continued)

(56) References Cited

U.S. PATENT DOCUMENTS

2009/0040974 A1* 2/2009 Goldhamer ........... H04W 74/02
370/329
2010/0195664 A1 8/2010 Ho
(Continued)

FOREIGN PATENT DOCUMENTS

EP 2894928 A1 7/2015

OTHER PUBLICATIONS

ISA/EP, International Search Report and Written Opinion of the International Searching Authority, Int'l Application No. PCT/US2016/046035, dated Oct. 21, 2016, European Patent Office, Rijswijk, NL, 13 pgs.

*Primary Examiner* — Jae Y Lee
*Assistant Examiner* — Jean F Voltaire
(74) *Attorney, Agent, or Firm* — Holland & Hart LLP

(57) ABSTRACT

Techniques for adjusting a contention window (CW) for transmissions in a shared radio frequency spectrum band may include identifying a number of nodes attempting to transmit using a channel of a shared radio frequency spectrum band and determining a target CW based on the number of nodes attempting to transmit. A new CW value may then be determined based on a prior CW value and the target CW value, and a listen-before-talk (LBT) procedure (e.g., a clear channel assessment (CCA)) to access the channel of the shared radio frequency spectrum band may be performed to access the channel.

30 Claims, 17 Drawing Sheets

(51) Int. Cl.
*H04W 74/08* (2009.01)
*H04L 5/00* (2006.01)
*H04W 16/14* (2009.01)
*H04W 72/12* (2009.01)
*H04W 88/10* (2009.01)
*H04W 88/02* (2009.01)

(52) U.S. Cl.
CPC ....... *H04W 72/1231* (2013.01); *H04W 74/02* (2013.01); *H04W 74/085* (2013.01); *H04W 74/0808* (2013.01); *H04W 72/1215* (2013.01); *H04W 88/02* (2013.01); *H04W 88/10* (2013.01)

(58) Field of Classification Search
USPC .......................................................... 370/329
See application file for complete search history.

(56) References Cited

U.S. PATENT DOCUMENTS

| | | |
|---|---|---|
| 2011/0103352 A1 | 5/2011 | Wentink |
| 2013/0203429 A1 | 8/2013 | Kneckt et al. |
| 2016/0278088 A1* | 9/2016 | Cheng ..................... H04L 47/27 |
| 2017/0238189 A1* | 8/2017 | Nolan ................... H04W 16/14 |
| | | 370/328 |
| 2018/0124807 A1* | 5/2018 | Smith ............... H04W 72/1215 |

* cited by examiner

TECHNIQUES FOR CONTENTION WINDOW ADJUSTMENT FOR TRANSMISSIONS IN A SHARED RADIO FREQUENCY SPECTRUM BAND

CROSS REFERENCES

The present Application for Patent claims priority to U.S. Provisional Patent Application No. 62/203,313 by Damnjanovic, et al., entitled "Techniques For Contention Window Adjustment For Transmissions In A Shared Radio Frequency Spectrum Band," filed Aug. 10, 2015, assigned to the assignee hereof.

BACKGROUND

Field of the Disclosure

The following relates generally to wireless communication, and more specifically to techniques for adjusting contention windows (CWs) for transmissions in a shared radio frequency spectrum band.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipment (UE) devices. A base station may communicate with UEs on downlink channels (e.g., for transmissions from a base station to a UE) and uplink channels (e.g., for transmissions from a UE to a base station).

In some cases, a wireless system may operate in shared or unlicensed radio frequency spectrum band. A UE or base station operating in the shared or unlicensed radio frequency spectrum band may perform a clear channel assessment (CCA) to verify that the channel is clear prior to transmitting. If the device senses that the channel is free, it may wait for a backoff period before attempting to transmit. The backoff period may reduce the chance of collisions if multiple devices are attempting to transmit at the same time. In some cases, the backoff period may be randomly chosen up to a predefined maximum value, which may be known as a contention window (CW). Wireless systems that do not adjust CWs based on detected signal traffic conditions may experience relatively frequent transmission conflicts between devices or a relatively inefficient utilization of communications resources.

SUMMARY

The present disclosure, for example, relates to one or more techniques for adjusting a contention window (CW) for transmissions in a shared radio frequency spectrum band. More particularly, the techniques may relate to identifying a number of transmissions using a channel of a shared radio frequency spectrum band between listen-before-talk (LBT) procedures, which may be related to a number of nodes attempting to transmit using the channel. A target CW for the channel of the shared radio frequency spectrum band may be determined based on the number of identified transmissions. A new CW value may then be determined based on a prior CW value and the target CW value, and a listen-before-talk (LBT) procedure (e.g., a clear channel assessment (CCA)) to access the channel of the shared radio frequency spectrum band may be performed to access the channel. In various examples, such techniques may be performed by a user equipment (UE) or a base station in a wireless communications network. In examples where a base station performs the techniques, the base station may apply a scaling factor (e.g., based on a number of devices being served, a number of devices scheduled to transmit during a time period, etc.) to the new CW value, and may transmit the scaled new CW to one or more UEs for use in a LBT procedure by the UEs.

A method of wireless communication at a wireless communications device is described. The method may include identifying an interruption per transmission (IPT) value based at least in part on a number of transmissions using a shared radio frequency spectrum band between two or more LBT procedures of the wireless communications device, determining a target CW value based at least in part on the IPT value, and calculating a new CW value based at least in part on a prior CW value associated with a prior LBT procedure of the wireless communications device and the target CW value.

An apparatus for wireless communication at a wireless communications device is described. The apparatus may include means for identifying an IPT value based at least in part on a number of transmissions using a shared radio frequency spectrum band between two or more LBT procedures of the wireless communications device, means for determining a target CW value based at least in part on the IPT value, and means for calculating a new CW value based at least in part on a prior CW value associated with a prior LBT procedure of the wireless communications device and the target CW value.

Another apparatus for wireless communication at a wireless communications device is described. The apparatus may include a processor, memory in electronic communication with the processor, and instructions stored in the memory and operable, when executed by the processor, to cause the apparatus to identify an IPT value based at least in part on a number of transmissions using a shared radio frequency spectrum band between two or more LBT procedures of the wireless communications device, determine a target CW value based at least in part on the IPT value, and calculate a new CW value based at least in part on a prior CW value associated with a prior LBT procedure of the wireless communications device and the target CW value.

A non-transitory computer-readable medium storing code for wireless communication at a wireless communications device is described. The code may include instructions executable to identify an IPT value based at least in part on a number of transmissions using a shared radio frequency spectrum band between two or more LBT procedures of the wireless communications device, determine a target CW value based at least in part on the IPT value, and calculate a new CW value based at least in part on a prior CW value associated with a prior LBT procedure of the wireless communications device and the target CW value.

Some examples of the method, apparatuses, or non-transitory computer-readable medium described herein may include operations, features, means, or instructions for initiating a subsequent LBT procedure based at least in part on the new CW value, and repeating the identifying, determining, and calculating following the subsequent LBT procedure. Additionally or alternatively, in some examples identifying the IPT value may include operations, features, means, or instructions for identifying a number of transmissions using the shared radio frequency spectrum band between a first LBT procedure of the wireless communications device and a second LBT procedure of the wireless communications device.

In some examples of the method, apparatuses, or non-transitory computer-readable medium described herein, identifying the IPT value may include operations, features, means, or instructions for averaging a plurality of identified numbers of transmissions between a plurality of LBT procedures of the wireless communications device. Additionally or alternatively, in some examples calculating the new CW value may include operations, features, means, or instructions for determining that the prior CW value is greater than the target CW value, and setting the new CW value as a minimum CW value.

In some examples of the method, apparatuses, or non-transitory computer-readable medium described herein, calculating the new CW value may include operations, features, means, or instructions for determining that the prior CW value is less than the target CW value, calculating a doubled prior CW value, and setting the new CW value as the doubled prior CW value or a maximum CW value if the doubled prior CW value exceeds the maximum CW value. Additionally or alternatively, in some examples determining that the prior CW value is less than the target CW value may include operations, features, means, or instructions for determining that a difference between the prior CW value and the target CW value exceeds a threshold.

In some examples of the method, apparatuses, or non-transitory computer-readable medium described herein, calculating the new CW value may include operations, features, means, or instructions for identifying a scaling factor for use in calculating the new CW value, applying the scaling factor to a difference between the target CW value and the prior CW value, and calculating the new CW value based at least in part on the scaled difference between the target CW value and the prior CW value. Additionally or alternatively, in some examples identifying the scaling factor may include operations, features, means, or instruction for determining the scaling factor based at least in part on one or more of a difference between the target CW value and the prior CW value, a number of prior LBT procedures in which the target CW value exceeds the prior CW value, a quality of service (QoS) parameter of data to be transmitted by the wireless communications device, or a number of nodes transmitting using the shared radio frequency spectrum band, or a combination thereof.

In some examples of the method, apparatuses, or non-transitory computer-readable medium described herein, identifying the number of transmissions using the shared radio frequency spectrum band may include operations, features, means, or instructions for identifying a first transmission using the shared radio frequency spectrum band, determining that the first transmission is a data transmission, and incrementing a count of the number of transmissions following the determination that the first transmission is a data transmission. Additionally or alternatively, in some examples identifying the number of transmissions using the shared radio frequency spectrum band may include operations, features, means, or instructions for determining that the first transmission is not a data transmission, and maintaining the count of the number of transmissions following the determination that the transmission not a data transmission.

In some examples of the method, apparatuses, or non-transitory computer-readable medium described herein, identifying the number of transmissions using the shared radio frequency spectrum band may include operations, features, means, or instructions for measuring an energy level of the shared radio frequency spectrum band based at least in part on one or more of an observation slot length, initial measurement deferral period, or backoff period. Additionally or alternatively, in some examples identifying a transmission may include operations, features, means, or instructions for determining a transmission based at least in part on the measured energy level exceeding an energy detection threshold value.

In some examples of the method, apparatuses, or non-transitory computer-readable medium described herein, the wireless communications device is a base station and the new CW may be used for transmission of a downlink (DL) transmission to a UE using the shared radio frequency spectrum band. Additionally or alternatively, in some examples the wireless communications device is a base station, and the method, apparatuses, or non-transitory computer-readable medium may include operations, features, means, or instructions for signaling the new CW value to one or more UE devices for use by the one or more UE devices in transmitting uplink (UL) transmissions to the base station using the shared radio frequency spectrum band.

Some examples of the method, apparatuses, or non-transitory computer-readable medium described herein may include operations, features, means, or instructions for scaling the new CW value based at least in part on a number of UEs that are scheduled to attempt a UL transmission to the base station and a total number of UEs configured to transmit using the shared radio frequency spectrum band. Additionally or alternatively, in some examples the wireless communications device is a UE and the new CW may be used for transmission of a UL transmission to a base station using the shared radio frequency spectrum band.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same may be distinguished by following the reference label by a dash and a second label that distinguishes among the similar compo

DETAILED DESCRIPTION

Figure 1:
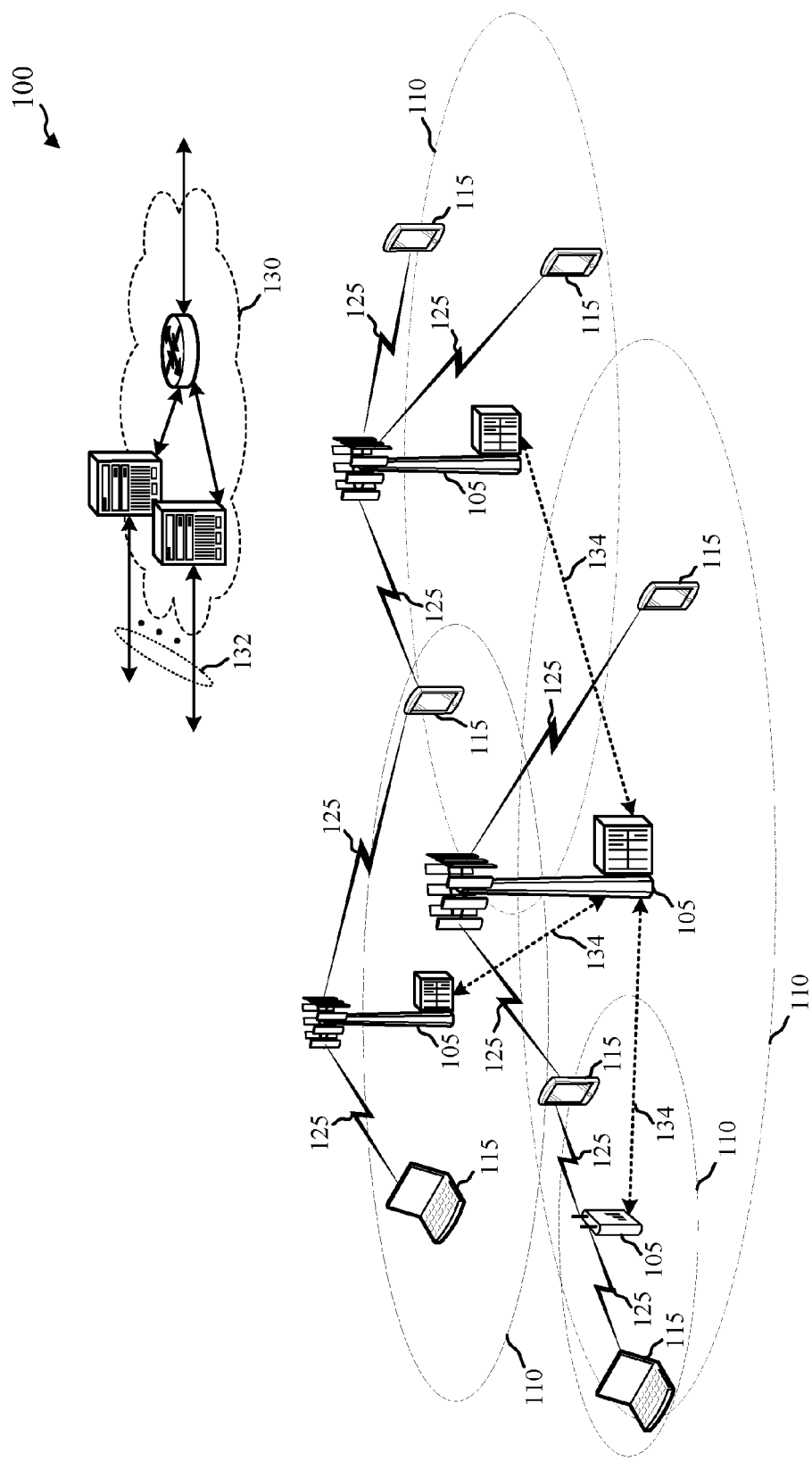
- FIG. 1 illustrates an example of a wireless communication system that supports CW adjustment for transmissions in a shared radio frequency spectrum band, in accordance with various aspects of the present disclosure.

Techniques are described in which a shared radio frequency spectrum band is used for at least a portion of communications over a wireless communication system. In some examples, the shared radio frequency spectrum band may be used for Long Term Evolution (LTE) or LTE Advanced (LTE-A) communications. The shared radio frequency spectrum band may be used in combination with, or independent from, a dedicated radio frequency spectrum band. The dedicated radio frequency spectrum band may be a radio frequency spectrum band for which transmitting apparatuses may not contend for access because the radio frequency spectrum band is licensed to particular users (e.g., a licensed radio frequency spectrum band usable for LTE/LTE-A communications). The shared radio frequency spectrum band may be a radio frequency spectrum band for which a device may need to contend for access (e.g., a radio frequency spectrum band that is available for unlicensed use, such as Wi-Fi use, or a radio frequency spectrum band that is available for use by multiple operators in an equally shared or prioritized manner).

In some wireless systems, devices may monitor the medium or channel according to a listen-before-talk (LBT) procedure for a period of time before sending data in order to prevent collisions. For example, a device may use a clear channel assessment (CCA). If the device senses that the channel is free, it may wait for a backoff period before attempting to transmit. The backoff period may reduce the chance of collisions if multiple devices are attempting to transmit at the same time. In some cases, the backoff period may be randomly chosen up to a predefined maximum value. The maximum backoff period may be known as a CW.

In some cases, collisions may still occur and the data may not be transmitted successfully. In such cases, the duration of the CW may be increased, which may provide more opportunities for multiple devices to successfully transmit. For example, in some cases the CW may double in duration for each instance that a transmission is not successful (e.g., an exponential backoff). In some examples (e.g., when one or more transmissions is successful) the duration of the CW may be decreased (e.g., halved). Other methods for determining the duration of the CW may be beneficial.

As described herein, a CW may be adjusted based on a number of nodes transmitting using a channel of a shared radio frequency spectrum band between previous transmit opportunities (TXOPs), where in some examples a TXOP may be referred to as a maximum channel occupancy time (MCOT). For example, a target CW may be determined based on a number of interruption(s) per transmission (IPT) that is identified based on a number of transmissions of other nodes between previous TXOPs. A new CW for a subsequent TXOP may be calculated based on the target CW and a prior CW. In some cases, the new CW may be dynamically implemented based on each of the previous TXOPs. The new CW may be calculated for downlink (DL) transmissions from a base station to a user equipment (UE), for example. In some examples, the new CW may be calculated by a UE for an uplink (UL) transmission. In other examples, a base station may calculate an uplink CW to be used by one or more UEs for UL transmissions. In some cases, the new CW to be used may be signaled to one or more UEs by the base station. Furthermore, in some examples, the new CW to be used by the one or more UEs may be scaled according to a number of UEs scheduled for transmission during a time period, a number of UEs configured to use the shared radio frequency spectrum band, or combinations thereof.

Aspects of the disclosure are initially described in the context of a wireless communication system. Specific examples are then described for a CW adjustment process. These and other aspects of the disclosure are further illustrated by and described with reference to apparatus diagrams, system diagrams, and flowcharts that relate to CW adjustment.

FIG. 1 illustrates an example of a wireless communication system 100 that supports CW adjustment for transmissions in a shared radio frequency spectrum band, in accordance with various aspects of the present disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X2, etc.), which may be wired or wireless communication links.

In some examples, wireless communication system 100 may operate using shared or unlicensed spectrum, such that base stations 105 and UEs 115 perform LBT procedures prior to transmitting on at least one wireless channel. Base stations 105 may determine CW sizes based on previous UL or DL TXOPs. An LBT procedure, such as a CCA, may include an energy detection procedure to determine whether there are any other active transmissions. For example, the device (e.g., a base station 105, a UE 115, etc.) may infer that a change in a received signal strength indicator (RSSI) of a power meter indicates that a channel is occupied. Specifically, signal power is that is concentrated in a certain bandwidth and exceeds a predetermined noise floor may indicate that another device is transmitting. A CCA may also include detection of specific sequences that indicate use of the channel. For example, another device may transmit a specific preamble prior to transmitting a data sequence. In some examples, such energy or preamble detection may also be used between TXOPs to determine a number of IPTs, which may identify a number of times other nodes of the wireless communication system 100 have transmitted using the channel. The IPT value may be used to determine a CW value for a subsequent CCA procedure, according to various examples described herein.

The base stations 105 may wirelessly communicate with the UEs 115 via at least one base station antenna. Each of the base station 105 sites may provide communication coverage for a respective geographic coverage area 110. In some examples, a base station 105 may be referred to as a base transceiver station, a radio base station, an access point, a radio transceiver, a NodeB, an evolved NodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 that cover different coverage areas (e.g., macro or small cell base stations). There may be overlapping geographic coverage areas 110 for different technologies.

In some examples, the wireless communication system 100 may include an LTE/LTE-A network. In LTE/LTE-A networks, the term eNB may be used to describe the base stations 105 (or entities including one or more base stations 105). The wireless communication system 100 may be a Heterogeneous LTE/LTE-A network in which different eNBs provide coverage for various geographical regions. For example, each eNB or base station 105 may provide communication coverage for a macro cell, a small cell, or others of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., dedicated, shared, etc.) radio frequency spectrums as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate various disclosed examples may be packet-based networks that operate according to a layered protocol stack. In the user plane, communications at the bearer or packet data convergence protocol (PDCP) layer may be IP-based. A medium access control (MAC) layer may perform packet segmentation and reassembly to communicate over logical channels, and may also perform priority handling and multiplexing of logical channels into transport channels. The MAC layer may also use hybrid automatic retransmission request (HARQ) to provide retransmission at the MAC layer to improve link efficiency. In the control plane, a Radio Resource Control (RRC) protocol layer may provide establishment, configuration, and maintenance of an RRC connection between a UE 115 and the base stations 105 or core network 130 supporting radio bearers for the user plane data. At the physical (PHY) layer, transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a wireless communications device, a personal computer (e.g., a laptop computer, a netbook computer, a tablet computer, etc.), a handheld device, a cellular telephone, a smart phone, a cordless phone, a wireless modem, a wireless local loop (WLL) station, a personal digital assistant (PDA), a digital video recorder (DVR), an internet appliance, a gaming console, an e-reader, an Internet of things (IoT) device, an Internet of Everything (IoE) device, a machine type communication (MTC) device, an appliance, an automobile, etc. A UE may be able to communicate with various base stations and network equipment, including macro eNBs, small cell eNBs, relay base stations, and the like. A UE may also be able to communicate using different radio access technologies (RATs), such as a cellular RAT (e.g., an LTE/LTE-A RAT), a Wi-Fi RAT, or other RATs.

In some examples of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

Base stations 105 and UEs 115 may communicate over the communication links 125 using carriers, which may also be referred to as component carriers, layers, channels, etc. The term component carrier (CC) may refer to each of the multiple carriers utilized by a UE operating in a carrier aggregation (CA) mode, and may be distinct from other portions of system bandwidth. For instance, a CC may be a relatively narrow-bandwidth carrier susceptible of being utilized independently or in combination with other component carriers. Each CC may provide the capabilities of an isolated carrier based on release 8 or release 9 of the LTE standard. Multiple CCs may be aggregated or utilized concurrently to provide some UEs 115 with greater bandwidth and, e.g., higher data rates. Thus, individual CCs may be backwards compatible with legacy UEs 115 (e.g., UEs 115 implementing LTE release 8 or release 9); while other UEs 115 (e.g., UEs 115 implementing post-release 8/9 LTE versions), may be configured with multiple CCs in a multi-carrier mode. A carrier used for downlink DL transmissions may be referred to as a DL CC, and a carrier used for UL transmissions may be referred to as a UL CC. A UE 115 may be configured with multiple DL CCs and one or more UL CCs for carrier aggregation. Each carrier may be used to transmit control information (e.g., reference signals, control channels, etc.), overhead information, data, etc.

A UE 115 may communicate with a single base station 105 utilizing multiple carriers, and may also communicate with multiple base stations simultaneously on different carriers. Each cell of a base station 105 may include an UL CC and a DL CC. The geographic coverage area 110 of each serving cell for abase station 105 may be different (e.g., CCs on different frequency bands may experience different path loss). In some examples, one carrier is designated as the primary carrier, or primary component carrier (PCC), for a UE 115, which may be served by a primary cell (PCell). Primary cells may be semi-statically configured by higher layers (e.g., radio resource control (RRC), etc.) on a per-UE basis. Certain uplink control information (UCI), e.g., acknowledgement (ACK)/negative acknowledgement (NACK), channel quality indicator (CQI), and scheduling information transmitted on a physical uplink control channel (PUCCH), are carried by the PCell. Additional carriers may be designated as secondary carriers, or secondary component carriers (SCC), which may be served by secondary cells (SCells). Secondary cells may likewise be semi-statically configured on a per-UE basis. In some cases, SCells may not include or be configured to transmit the same control information as the PCell.

In some cases, wireless communication system 100 may utilize one or more enhanced component carriers (eCCs). In some examples, the utilization of eCCs may be referred to as New Radio (NR) and/or 5G, and the use of eCCs over a shared spectrum may be referred to as New Radio for Shared Spectrum (NR-SS). An SCell may, for instance, be an eCC. An eCC may be characterized by one or more features including: wider bandwidth, shorter orthogonal frequency division multiplexing (OFDM) symbol duration, shorter transmission time interval (TTIs), and a different over-the-air communication protocol. In some cases, an eCC may be associated with a CA configuration or a dual connectivity configuration (e.g., when multiple serving cells have a suboptimal backhaul link). An eCC may also be configured for use in unlicensed spectrum or shared spectrum (where more than one operator is allowed to use the spectrum). An eCC characterized by wider bandwidth may include one or more segments that may be utilized by UEs 115 that are not capable of monitoring the whole bandwidth or prefer to use a limited bandwidth (e.g., to conserve power).

In some cases, an eCC may utilize a different symbol duration, which may be a reduced symbol duration compared to symbol durations of other CCs. A shorter symbol duration is associated with increased subcarrier spacing. A TTI in eCC may consist of one or multiple symbols. In some cases, the TTI duration (e.g., the number of symbols in a TTI) may be variable. In some examples, an eCC may include multiple hierarchical layers associated with different TTI durations. For example, TTIs at one hierarchical layer may correspond to uniform one millisecond (1 ms) subframes, whereas in a second layer, variable duration TTIs may correspond to bursts of short duration. In conjunction with the reduced TTI duration, an eCC may utilize dynamic time division duplex (TDD) operation (i.e., it may switch from DL to UL operation for short bursts according to dynamic conditions).

Wider bandwidth and shorter TTIs may be associated with a modified control channel configuration (e.g., an eCC may utilize an enhanced physical downlink control channel (ePDCCH) for DL control information). For example, one or more control channels of an eCC may utilize frequency division multiplexing (FDM) scheduling to accommodate flexible bandwidth use. Other control channel modifications include the use of additional control channels (e.g., for evolved multimedia broadcast multicast service (eMBMS) scheduling, or to indicate the length of variable length UL and DL bursts), or control channels transmitted at different intervals.

Figure 2:
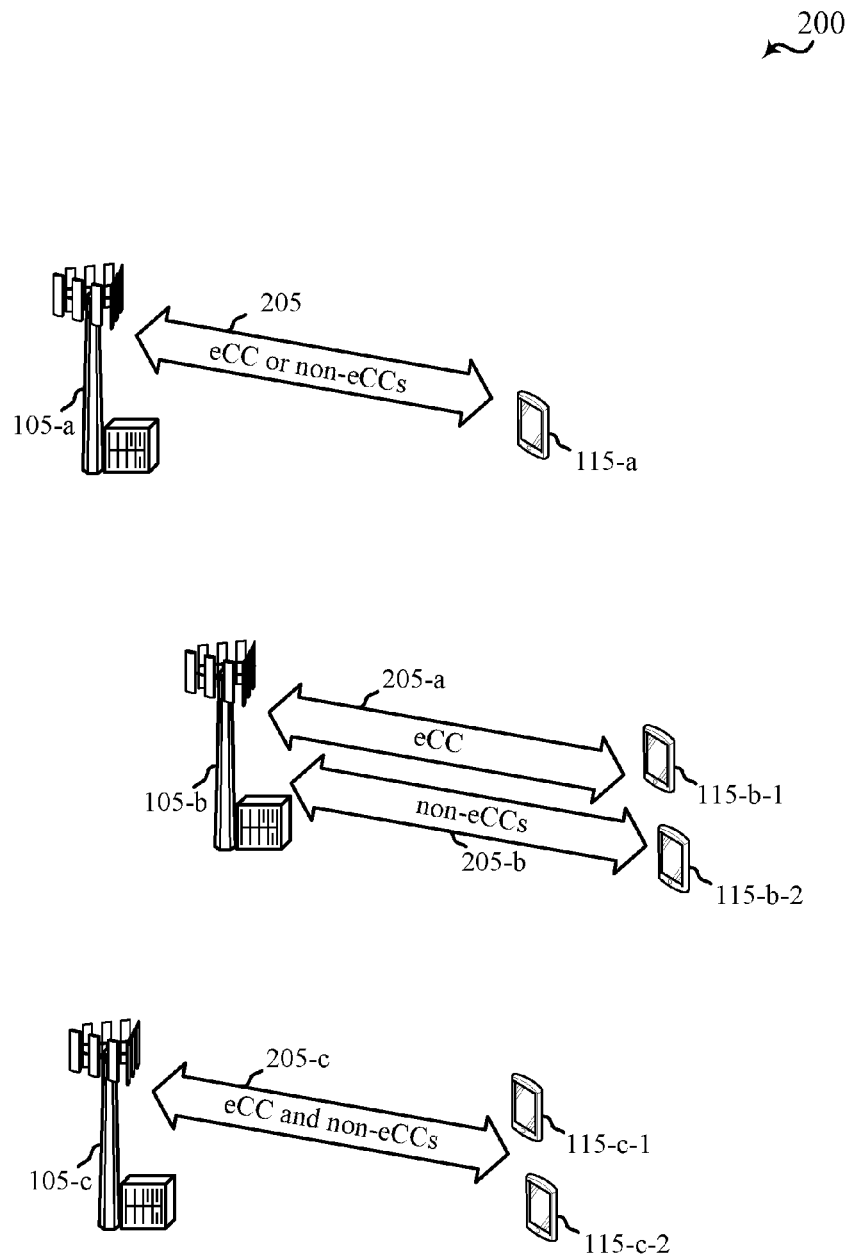
FIG. 2 illustrates an example of a wireless communication system that supports CW adjustment for transmissions in a shared radio frequency spectrum band, in accordance with various aspects of the present disclosure.

FIG. 2 illustrates an example of a wireless communication system 200 that supports CW adjustment for transmissions in a shared radio frequency spectrum band, in accordance with various aspects of the present disclosure. The wireless communication system 200 may include a number of base stations 105-a, 105-b, 105-c and a number of UEs 115-a, 115-b-1, 115-b-2, 115-c-1, 115-c-2, which may be examples of aspects of the base stations 105 or UEs 115 described with reference to FIG. 1. In some examples, each of the base stations 105-a, 105-b, and 105-c may communicate with a number of UEs over a shared radio frequency spectrum band. Some or all of the base stations 105-a, 105-b, 105-c may also communicate with UEs over a dedicated radio frequency spectrum band. The shared radio frequency spectrum band may include a radio frequency spectrum band for which transmitting devices may contend for access (e.g., a radio frequency spectrum band that is available for unlicensed use, such as Wi-Fi use, or a radio frequency spectrum band that is available for use by multiple operators in an equally shared or prioritized manner). The dedicated radio frequency spectrum band may include a radio frequency spectrum band for which transmitting devices may not contend for access (e.g., a radio frequency spectrum band licensed to particular users for particular uses, such as a licensed radio frequency spectrum band usable for LTE/LTE-A communications).

By way of example, a first base station 105-a may communicate with a number of UEs, including a first UE 115-a, in a shared channel 205 of the shared radio frequency spectrum band. In some examples, the shared channel 205 may be an 80 MHz channel that includes a 20-80 MHz eCC and up to four 20 MHz non-eCCs. To provide coexistence between eCC communications, non-eCC communications, and possibly communications of other technologies (e.g., Wi-Fi technologies) in the shared channel 205, the base station 105-a may serve eCC capable UEs or non-eCC capable UEs in the shared channel 205. In addition, the base station 105-a may contend for access to the shared channel 205 of the shared radio frequency spectrum band. In some examples, contending for access to the shared channel 205 may include performing a LBT procedure, such as a CCA procedure or an enhanced clear channel assessment (eCCA) procedure. In some examples, the base station 105-a may contend for access to the shared channel 205 by separately and contemporaneously contending for access to each 20 MHz segment of the shared channel 205. Upon winning contention for access to part, or all, of the shared channel 205, the base station 105-a may communicate with the UE 115-a over at least part of the shared channel 205.

By way of further example, a second base station 105-b may communicate with at least one eCC capable UE (e.g., a second UE 115-b-1) and at least one non-eCC capable UE (e.g., a third UE 115-b-2) in respective first and second shared channels of the shared radio frequency spectrum band. In some examples, each of the shared channels 205-a and 205-b may be an 80 MHz channel that includes a 20-80 MHz eCC and up to four 20 MHz non-eCCs. To provide coexistence between eCC communications, non-eCC communications, and possibly communications of other technologies (e.g., Wi-Fi technologies) in the shared channels 205-a and 205-b, the base station 105-b may serve eCC capable UEs on the shared channel 205-a and serve non-eCC capable UEs on the shared channel 205-b. In this manner, a frequency separation may be provided between eCC and non-eCC communications. In addition, the base station 105-b may contend for access to the shared channels 205-a and 205-b. In some examples, contending for access to the shared channels 205-a and 205-b may include performing an LBT procedure, such as a CCA procedure or an eCCA procedure. In some examples, the base station 105-b may contend for access to the shared channels 205-a and 205-b by separately and contemporaneously contending for access to each 20 MHz segment in the shared channels 205-a and 205-b. Upon winning contention for access to part or all of a shared channel 205-a or 205-b, the base station 105-b may communicate with the UEs 115-b-1 or 115-b-2 over at least part of the shared channel 205-a or 205-b.

When communicating with eCC capable UEs and non-eCC capable UEs in the shared channels 205-a and 205-b, the base station 105-c may employ coexistence techniques to avoid channel interference due to radio frequency (RF) leakage (e.g., techniques to reduce adjacent channel leakage power ratios (ACLRs)). The coexistence techniques may include, for example, interference avoidance, mitigation, or cancelation techniques.

By way of further example, a third base station 105-c may communicate with at least one eCC capable UE (e.g., a fourth UE 115-c-1) and at least one non-eCC capable UE (e.g., a fifth UE 115-c-2) in a shared channel 205-c of the shared radio frequency spectrum band. In some examples, the shared channel 205-c may be an 80 MHz channel that includes a 20-80 MHz eCC and up to four 20 MHz non-eCCs. To provide coexistence between eCC communications, non-eCC communications, and possibly communications of other technologies (e.g., Wi-Fi technologies) in the shared channels 205-c, the base station 105-c may serve eCC capable UEs and non-eCC capable UEs in a FDM or time division multiplexed (TDM) manner on the shared channel 205-c. In this manner, a time separation may be provided between eCC and non-eCC communications. In addition, the base station 105-c may contend for access to the shared channel 205-c. In some examples, contending for access to the shared channel 205-c may include performing an LBT procedure, such as a CCA procedure or an eCCA procedure. In some examples, the base station 105-c may contend for access to the shared channel 205-c by separately and contemporaneously contending for access to each 20 MHz segment in the shared channel 205-c. Upon winning contention for access to part, or all, of the shared channel 205-c, the base station 105-c may communicate with the UEs 115-c-1 and 115-c-2 over at least part of the shared channel 205-c.

Figure 3A:
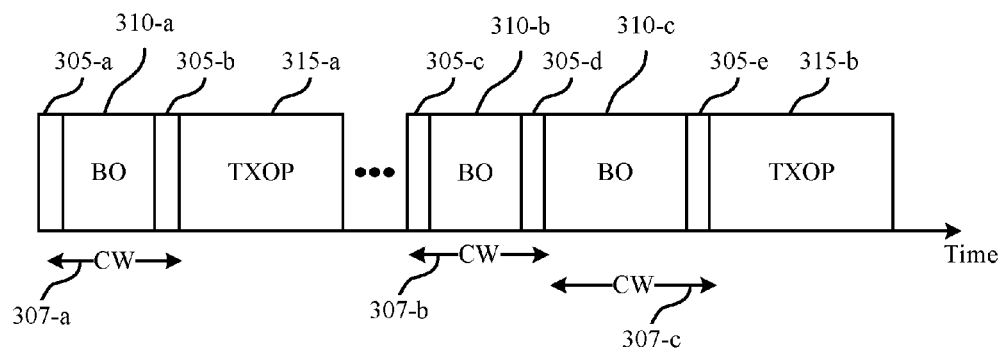
FIG. 3A shows a timing diagram of CWs based on multiple LBT attempts and associated CW backoff periods, in accordance with various aspects of the present disclosure.

FIG. 3A shows a timing diagram 300 of CWs 307 based on multiple LBT attempts and associated backoff periods 310, in accordance with various aspects of the present disclosure. CWs 307 may be utilized by wireless communications devices that may access a channel of a wireless communications system, such as a wireless communication system 100 or 200 described with reference to FIG. 1 or 2. In some cases, a device may monitor the medium or channel for a period of time before sending data in order to prevent collisions. If the device senses that the channel is free, it may wait for a backoff period 310 before attempting to transmit. In some cases, the backoff period 310 may be randomly chosen up to a predefined maximum value. The maximum backoff period may be known as a CW. In some cases, collisions may still occur. In such cases, the duration of the CW may be increased, which may provide more opportunities for multiple devices to successfully transmit.

Time periods 305-a, 305-b, 305-c, 305-d, and 305-e may represent a wireless communications device (e.g., a UE, a base station, a Wi-Fi node, etc.) performing a carrier sense operation. If the device determines that the carrier is available at time period 305-a, it may enter a backoff period. Backoff periods 310-a, 310-b, and 310-c may represent the periods following a detection of a transmission conflict. A backoff period may be randomly chosen from a range of values, which may be represented by CW 307-a, 307-b, and 307-c. That is, backoff period 310-a may be less than or equal to CW 307-a. When backoff period 310-a expires, the device may perform a carrier sense at time period 305-b. If the carrier is available, the device may then transmit using the carrier. Thus, TXOP 315-a may represent a period available for transmission.

After a transmission, a device may reset its CW back to the initial CW size, and the cycle of adding backoff times to the CW may be repeated for subsequent LBT procedures. For example, for a subsequent transmission, device may again sense the medium in time period 305-c and enter backoff period 310-b if the carrier is available. CW 307-b may be an initial CW size, which in some cases may be based on a quality of service (QoS) parameter of the data to be transmitted by the device. After backoff period 310-b expires, the device may again sense the carrier at time period 305-d. If the carrier is busy, it may increase the CW size for CW 307-c. When backoff period 310-c expires, device may again sense the carrier at time period 305-e. If the carrier is free, it may then transmit in TXOP 315-b. In this manner, the total time period from an initial carrier sense to the initiation of a transmission may be dependent upon the number of attempts in which the channel is occupied, which may depend on a number of factors, such as a number of other nodes attempting to transmit using the channel, an amount of data that each node has to transmit, etc.

Figure 3B:
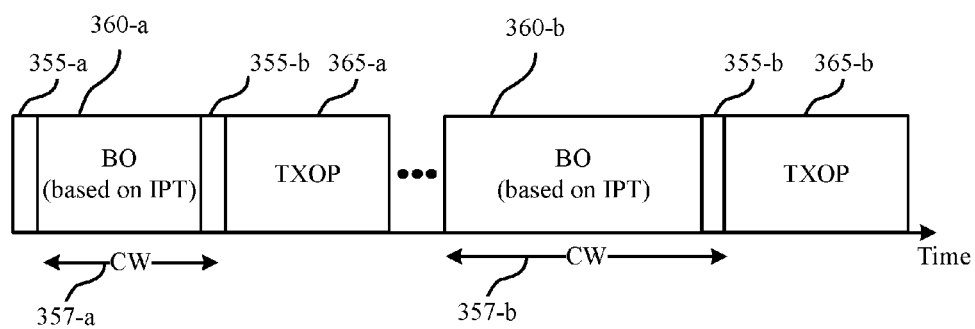
FIG. 3B shows a timing diagram of CW determination based on identification of IPT values from one or more prior TXOPs, in accordance with various aspects of the present disclosure.

As mentioned above, other devices may operate using the shared radio frequency spectrum band, and may use different techniques for establishing a CW duration rather than adding a backoff after each time a carrier is sensed as being busy. One such technique is illustrated in the example of FIG. 3B, shows a timing diagram 350 of CWs 357 based on IPT values from one or more prior TXOPs, in accordance with various aspects of the present disclosure. CWs 357 may be utilized by a UE 115 and base station 105 described with reference to FIGS. 1-2, in some examples. That is, CWs 357 may represent examples of a base station 105 or UE 115 adjusting a CW based on a preceding TXOP. In some cases, the adjustment may be based on multiple previous TXOPs, including both successful and unsuccessful CCAs of the base station 105 or UE 115.

In some examples, the UE or base station may sense the medium in time period 355-a, which may be associated with a CCA for accessing a channel of a shared radio frequency spectrum band. The UE or base station may wait during a backoff period 360-a, which may be based on a CW 357-a calculated based on an IPT value identified from one or more prior LBT procedures. Following backoff period 360-a, the base station or UE may sense the medium in time period 355-b as part of a CCA procedure, and based on the status of the medium, may initiate a transmission during TXOP 365-a. During the time period between consecutive TXOPs, the base station or UE may identify a number of IPTs, and recalculate CW sizes based on the number of identified IPTs. In the example of FIG. 4B, the backoff period 360-b may be determined based on CW 357-b that is calculated according to such techniques. Following backoff period 360-b, the medium may be sensed in time period 355-b, followed by a TXOP 365-b.

Figure 4:
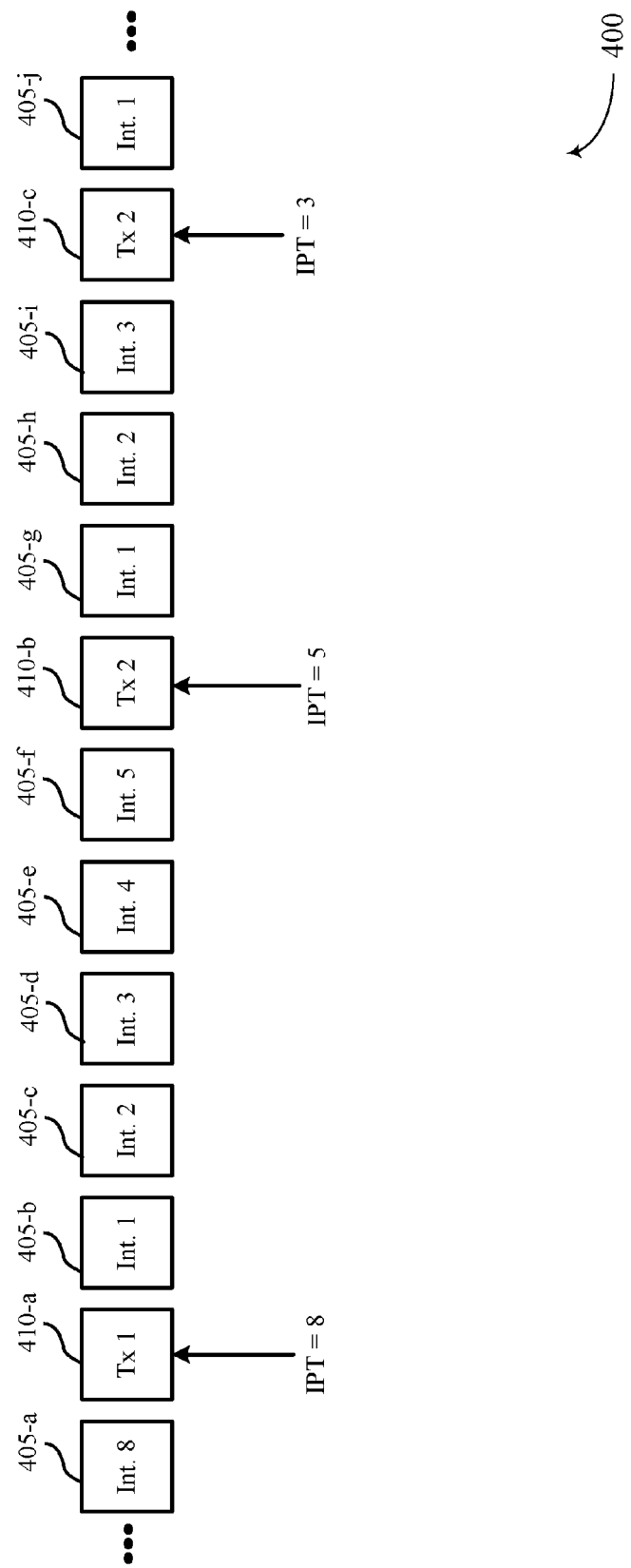
FIG. 4 shows a diagram illustrating the identification of IPTs between successive TXOPs, in accordance with various aspects of the present disclosure.

As discussed, in some examples a CW may be calculated based on an IPT value indicating a number of transmissions that are identified for a channel between successive transmission attempts (e.g., between successive CCAs). FIG. 4 shows a diagram 400 illustrating the identification of interruptions 405 between successive TXOPs 410, in accordance with various aspects of the present disclosure. Identification of interruptions 405 may be utilized by a UE 115 and base station 105 described with reference to FIGS. 1-2, in some examples. That is, a UE 115 or base station 105 may calculate a new CW based on a number of interruptions 405 since one or more previous TXOPs (e.g., IPTs). For example, a base station 105 may detect 8 interruptions, with the eighth interruption 405-a illustrated in FIG. 4, prior to a first TXOP 410-1. In this case, the IPT for the first TXOP 410-a may be set to 8. The base station may then monitor the channel and identify five interruptions 405-b, 405-c, 405-d, 405-e, and 405-f prior to a second TXOP 410-b. Thus, the IPT for the second TXOP 410-b may be set to 5. Between the second TXOP 410-b and a third TXOP 410-c, the base station may detect three interruptions 405-g, 405-h, and 405-i, thus providing an IPT value of three for the third TXOP 410-c. Such measurements may continue, with base station identifying interruption 405-j, and so on. While the example of FIG. 4 is described for a base station, such techniques may be used by a UE or other device that is configured to use the unlicensed radio frequency spectrum band.

As mentioned, after each attempt to transmit using the channel, such as after each successful or unsuccessful CCA, a UE or base station may identify the IPT for the attempt. The IPT may be used to compute a target CW, as discussed with respect to FIG. 3B. In some examples, the target CW may be determined based on an established formula that defines a target CW based on a number of observed IPTs (e.g., the target CW may be determined as: CW=15+ 3.2*IPT). In some examples, the target CW may be determined in order to achieve a total CW size that would approximate the total CW size for a device that uses an exponential backoff adjustment for each instance a channel is detected to be busy. Such a target CW size may depend on a number of factors, such as a number of nodes contending for access to the channel. In some examples, different adjustment mechanisms may be used based on whether the target CW is larger or smaller than a prior CW value associated with a prior LBT procedure. In some examples, if the prior CW is greater than the target CW, a new CW may be calculated as the minimum CW size. In other examples, if the prior CW is greater than the target CW, a new CW may be calculated as the minimum of one-half of the prior CW size or a minimum CW size. If the prior CW is less than or equal to the target CW size, in some examples the new CW may be calculated as the minimum of twice the prior CW size or a maximum CW size.

The relationship between the target CW and the prior CW, as mentioned, may be determined to approximate a total backoff time of a device that uses an exponentially increasing backoff time for accessing an unlicensed radio frequency spectrum band. Such a relationship may be a linear relationship, or a polynomial relationship. In other examples, a new CW size may be calculated based on a weighting factor, such as according to:

New CW=prior CW+α*(target CW−prior CW), or

CW($n$+1)=α*CW($n$)+(1−α)*CW(target)

in which the value of a may be selected based on a number of access attempts, a QoS parameter of data to be transmitted, or other factors. In some examples, the value of IPT may increase with increasing numbers of devices contending for access to the unlicensed radio frequency spectrum band, with such an increase being an approximately linear increase. In some examples, the relationship between the target CW and the prior CW may be based on an identification of a number of devices contending for access to the radio frequency spectrum band. For example, if n contending devices are present, the relationship between IPT and the number of contending devices may be given based on the following exemplary formulas for other contending devices that use exponential backoff increases:

IPT=0.9+0.6$n$

IPT=−0.0019$n^2$+0.731$n$−0.229.

It is to be noted that the different formulas provided herein are for purposes of illustration and discussion only, and that other or different formulas may be established based on the characteristics of a particular operating scenario and wireless network deployment. Continuing with the above example, based on the relationship between IPT and the number of contending devices, a backwards compatible calibration curve for IPT may correspond to:

target CW=−0.0131*ipt$^2$+3.2180*ipt+13.9265

As mentioned above, IPT may be determined based on the identification of a transmission by another node between successive transmission attempts by, for example, a base station using an unlicensed radio frequency spectrum band. Such identification may be made based on one or more factors, such as an energy detection threshold (e.g., as per current ETSI EN 301 893 V1.8.0), observation slot length and energy sensing, initial deferral times, and backoff mechanism, for example. In some examples, the time between successive attempts, for purposes of counting IPTs, may be identified as a number of idle slots the node counts before being able to transmit, not counting an initial referral period, may be determined based on a randomly selected value N that is uniformly distributed between 1 and CW, selected after each transmission. In some examples, the allowed CW values may be [4, 8, 16, 32, 64, 128, 256, 512, 1024]. In some examples, the allowed CW values, and associated target CW, may be adjusted based on a QoS parameter of the data to be transmitted. For example, for best efforts data, a minimum CW value may be set to 16, and for voice data a minimum CW value may be set to 4 or 8. Based on the IPT value, a new CW may be calculated after each transmission attempt in a manner as discussed herein.

In some examples, a base station may monitor preambles for the transmissions between successive LBT procedures to determine if the transmissions are data transmissions or control transmissions (e.g., request-to-send (RTS) or clear-to-send (CTS) transmissions). The base station may increment an IPT value for data transmissions, and not increment the IPT value for control transmissions, in order to provide an IPT value that is based on actual data transmissions rather than on an inflated number of both data and control transmissions that are associated with a single transmission event.

While the examples discussed above refer to a base station and CW calculation by a base station, such techniques also may be used by UEs for uplink data. In some examples, a base station may schedule one or more UEs for uplink transmissions, and may transmit a CW that is to be used by UEs for UE LBT procedures. In some examples, the value of the CW that is provided for UEs may be scaled based at least in part on a number of UEs that are scheduled to attempt a UL transmissions to the base station and a total number of UEs configured to transmit using the shared radio frequency spectrum band. Such scaling may increase the likelihood of transmission by the same amount as the likelihood is decreased by the fact that after winning contention, only a scheduled UE can transmit.

Figure 5:
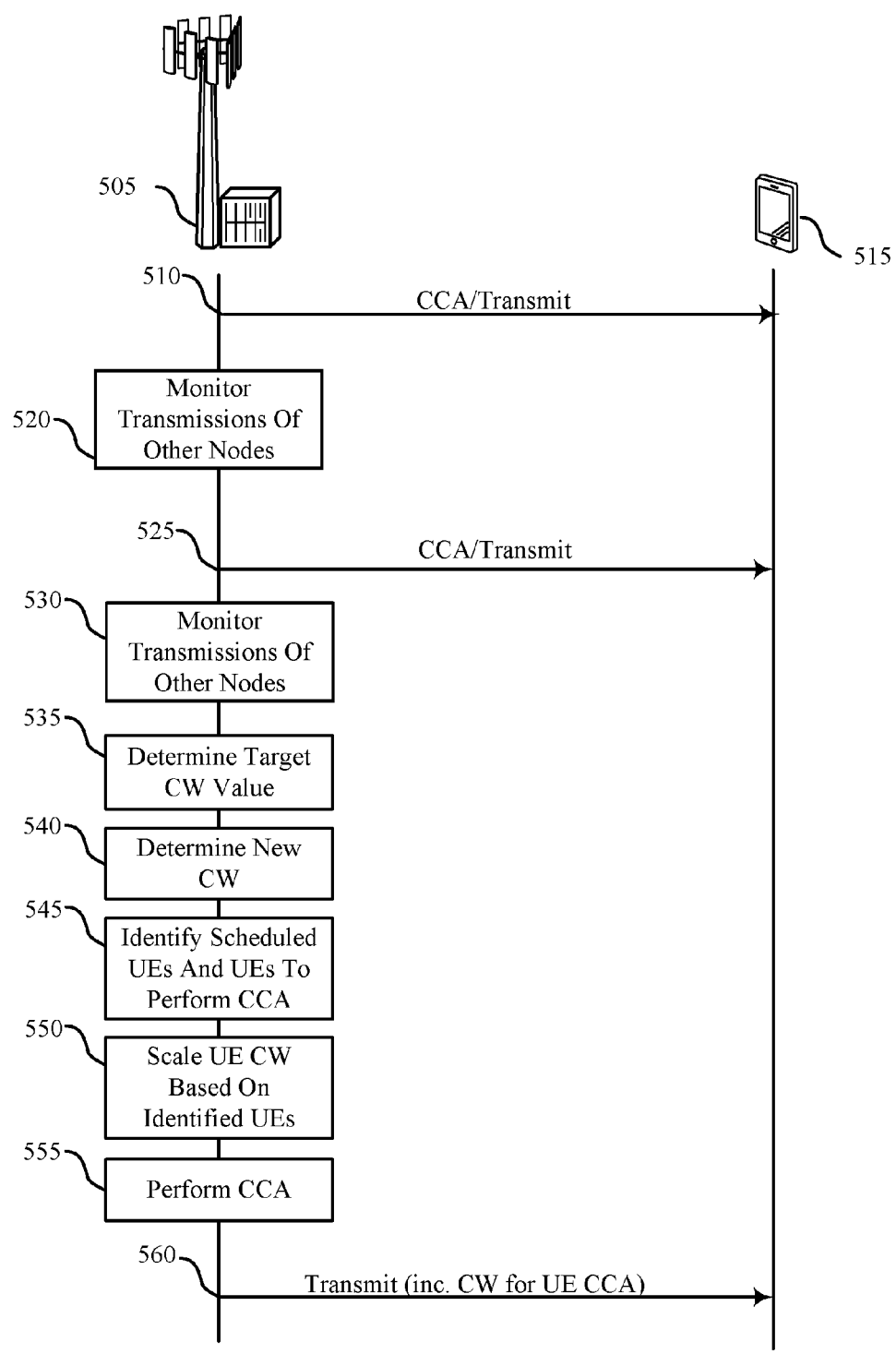
FIGS. 5 and 6 illustrate examples of process flows that support CW adjustment for transmissions in a shared radio frequency spectrum band, in accordance with various aspects of the present disclosure.

FIG. 5 illustrates an example of a process flow 500 that supports CW adjustment for transmissions in a shared radio frequency spectrum band, in accordance with various aspects of the present disclosure. Process flow 500 may include a UE 515 and base station 505, which may be examples of a UE 115 and base station 105 described with reference to FIGS. 1-2.

At 510, the base station 505 may perform a CCA and send a transmission. At 520, the base station may monitor transmissions of other nodes to identify an IPT value based on a number of transmissions using a shared radio frequency spectrum band between successive LBT procedures. At 525, the base station 505 may then perform a CCA and send a transmission, and at 530 may again monitor transmissions of other nodes to identify another IPT value. At 535, the base station 505 may determine a target CW value based on the IPT value. Subsequently, at 540 the base station 505 may determine a new CW value, in a manner described herein. In some examples, the base station 505 may identify scheduled UEs and UEs to perform CCA at 545, and scale the new CW value for the UEs based on the identified UEs at block 550. Such scaling may increase the likelihood of transmission by the same amount as the likelihood is decreased by the fact that after winning contention, only a scheduled UE can transmit. At 555, the base station 505 may perform another CCA, followed by transmitting a transmission at 560, which may include data to be transmitted as well as the CW to be used by UE 515 for a subsequent CCA.

Figure 6:
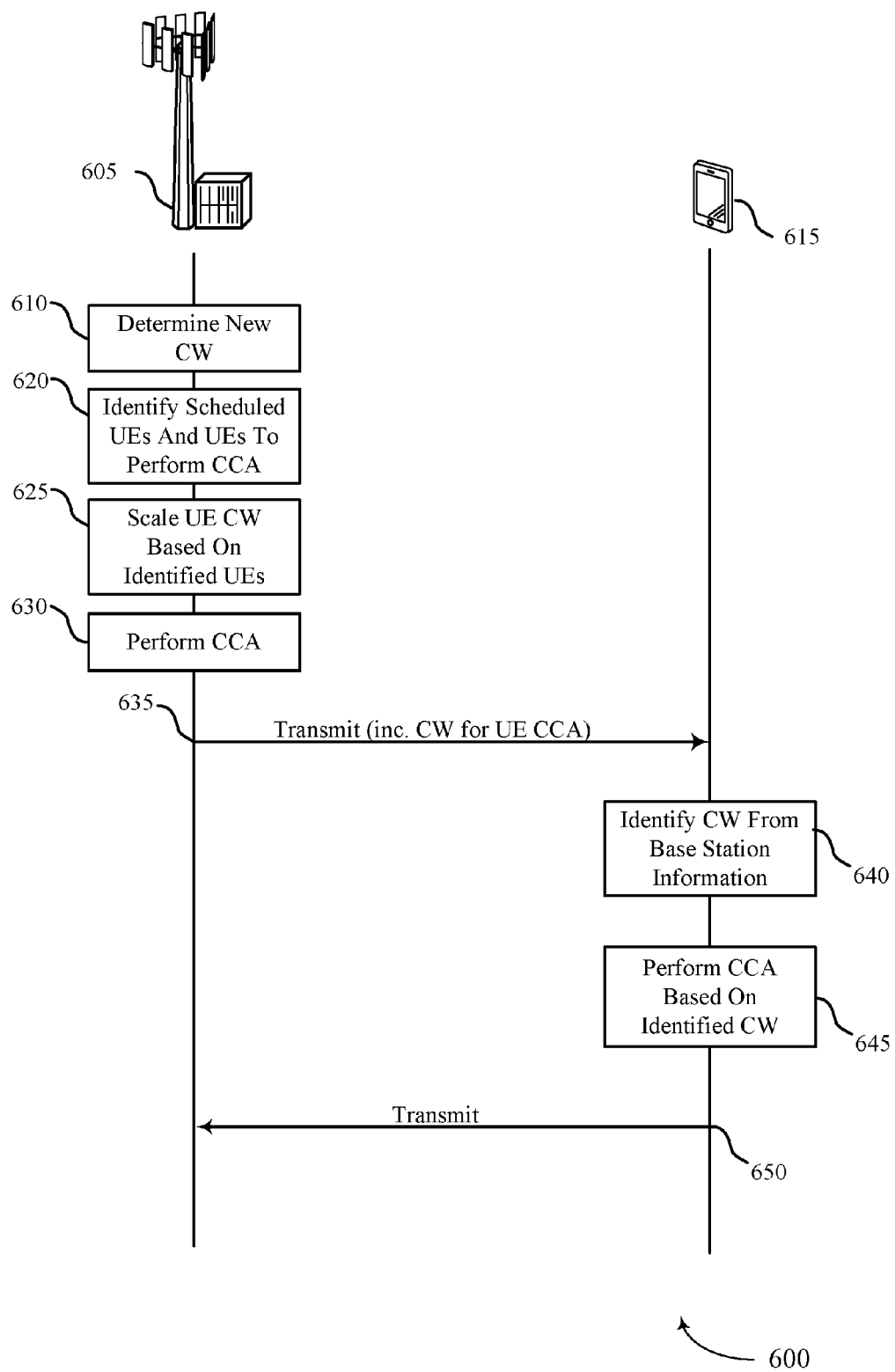

FIG. 6 illustrates an example of a process flow 600 that supports CW adjustment for transmissions in a shared radio frequency spectrum band, in accordance with various aspects of the present disclosure. Process flow 600 may include a UE 615 and base station 605, which may be examples of a UE 115 or 515 and base station 105 or 505 described with reference to FIG. 1-2, or 5.

At 610, the base station 605 may determine a new CW value, in a manner described herein. At 620, the base station 605 may identify scheduled UEs and UEs to perform CCA, and subsequently scale the new CW value for the UEs based on the identified UEs at 625. Such scaling, as discussed herein, may increase the likelihood of transmission by the same amount as the likelihood is decreased by the fact that after winning contention, only a scheduled UE can transmit. At 630, the base station 605 may perform a CCA, followed by transmitting a transmission at 635, which may include data to be transmitted as well as the CW to be used by UE 615 for a subsequent CCA. At 640, the UE 615 may identify a CW to be used from the information provided in the transmission of 635. The UE 615 may then, at 645, perform a CCA based on the CW provided by base station 605. In some examples, the transmission of 635 may include broadcast information of the CW value to multiple UEs, or may include UE-specific CW values. UE 615 may then transmit a transmission at 650 in the event that the CCA indicates the channel is available for transmission.

Figure 7:
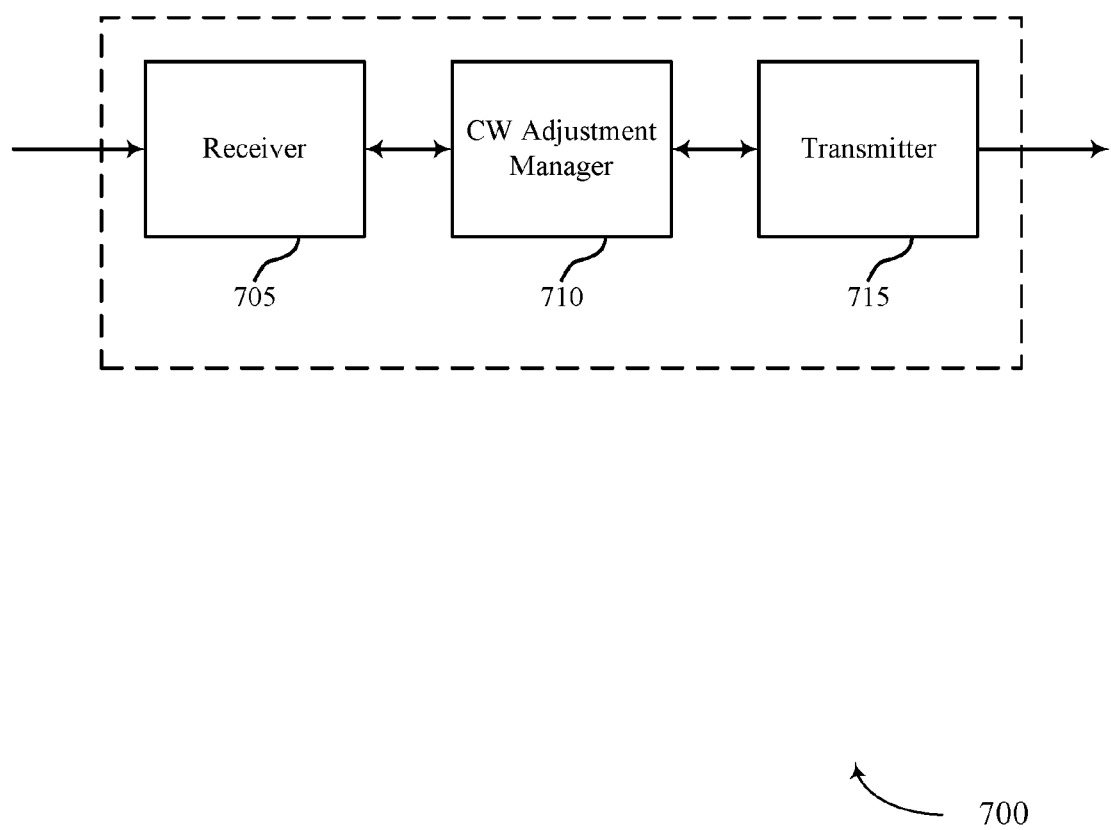
FIGS. 7 and 8 show block diagrams of wireless communications devices that support CW adjustment for transmissions in a shared radio frequency spectrum band, in accordance with various aspects of the present disclosure.

FIG. 7 shows a block diagram of a wireless communications device 700 that supports CW adjustment for transmissions in a shared radio frequency spectrum band, in accordance with various aspects of the present disclosure. Wireless communications device 700 may be an example of aspects of a UE or base station described with reference to FIGS. 1-6. Wireless communications device 700 may include a receiver 705, a CW adjustment manager 710, or a transmitter 715. Wireless communications device 700 may also include a processor. Each of these components may be in communication with each other.

The receiver 705 may receive information such as packets, user data, or control information associated with various information channels (e.g., control channels, data channels, and information related to techniques for CW adjustment for transmissions in a shared radio frequency spectrum band, etc.). Information may be passed on to the CW adjustment manager 710, and to other components of wireless communications device 700.

The CW adjustment manager 710 may identify an IPT value based at least in part on a number of transmissions using a shared radio frequency spectrum band between two or more LBT procedures of the wireless communications device 700, determine a target CW value based at least in part on the IPT value, and calculate a new CW value based at least in part on a prior CW value associated with a prior LBT procedure of the wireless communications device 700 and the target CW value.

The transmitter 715 may transmit signals received from other components of wireless communications device 700. In some examples, the transmitter 715 may be collocated with the receiver 705 in a transceiver manager. The transmitter 715 may include a single antenna, or it may include a plurality of antennas.

Figure 8:
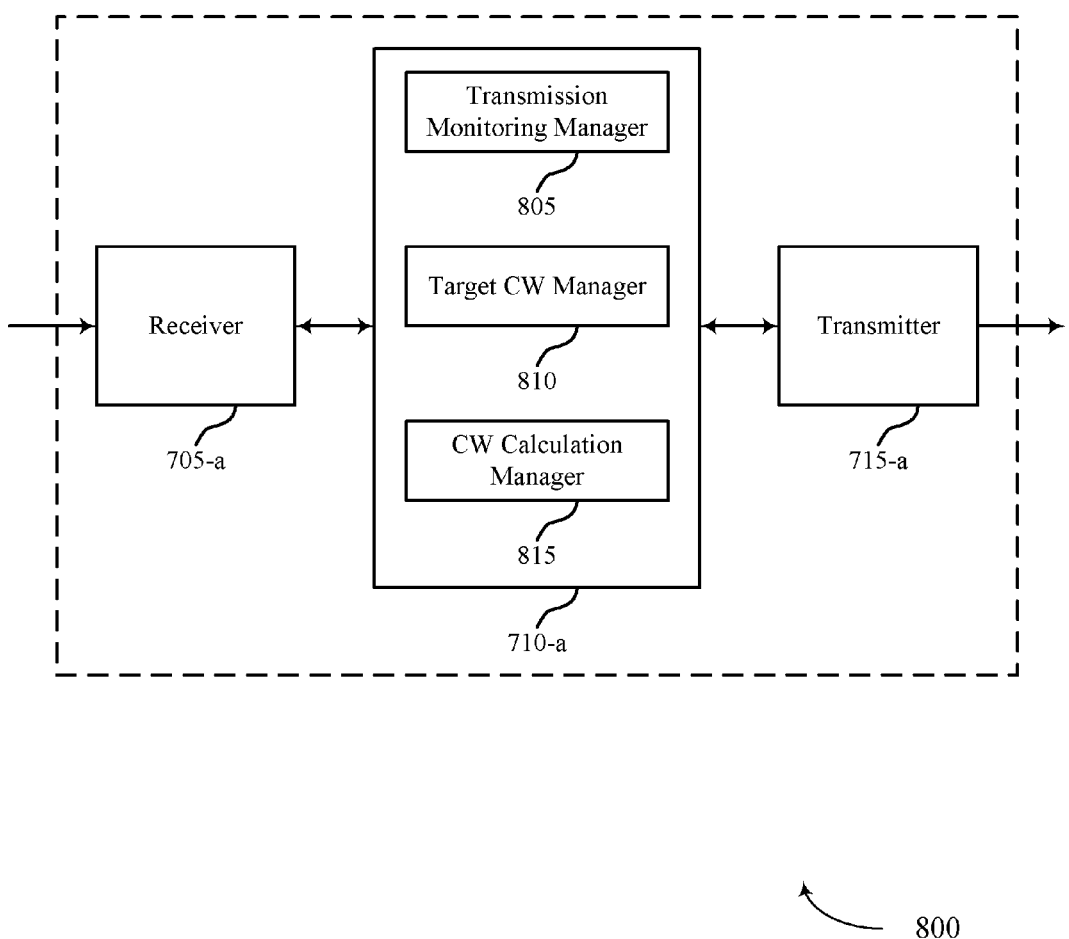

FIG. 8 shows a block diagram of a wireless communications device 800 that supports CW adjustment for transmissions in a shared radio frequency spectrum band, in accordance with various aspects of the present disclosure. Wireless communications device 800 may be an example of aspects of UE or base station described with reference to FIGS. 1-6, or a wireless communications device 700 described with reference to FIG. 7. Wireless communications device 800 may include a receiver 705-*a*, a CW adjustment manager 710-*a*, or a transmitter 715-*a*. Wireless communications device 800 may also include a processor. Each of these components may be in communication with each other. The CW adjustment manager 710-*a* may include a transmission monitoring manager 805, a target CW manager 810, and a CW calculation manager 815.

The receiver 705-*a* may receive information which may be passed on to CW adjustment manager 710-*a*, and to other components of wireless communications device 800. The CW adjustment manager 710-*a* may perform the operations described with reference to FIG. 7. The transmitter 715-*a* may transmit signals received from other components of wireless communications device 800.

The transmission monitoring manager 805 may identify an IPT value based at least in part on a number of transmissions using a shared radio frequency spectrum band between two or more LBT procedures of the wireless communications device 800 as described with reference to FIGS. 1-6. In some examples, identifying the IPT value may include identifying a number of transmissions using the shared radio frequency spectrum band between a first LBT procedure of the wireless communications device 800 and a second LBT procedure of the wireless communications device 800. In some examples, identifying the IPT value may include averaging a plurality of identified numbers of transmissions between a plurality of LBT procedures of the wireless communications device 800. In some examples, identifying the number of transmissions using the shared radio frequency spectrum band may include measuring an energy level of the shared radio frequency spectrum band based at least in part on one or more of an observation slot length, initial measurement deferral period, or backoff period. In some examples, a transmission may be determined based at least in part on the measured energy level exceeding an energy detection threshold value. The transmission monitoring manager 805 may also repeat the identifying, determining, and calculating following a subsequent LBT procedure.

The target CW manager 810 may determine a target CW value based at least in part on an IPT value as described with reference to FIGS. 1-6.

The CW calculation manager 815 may calculate a new CW value based at least in part on a prior CW value associated with a prior LBT procedure of the wireless communications device 800 and a target CW value as described with reference to FIGS. 1-6. In some examples, calculating the new CW value may include determining that the prior CW value may be greater than the target CW value. In some examples, calculating the new CW value may include determining that the prior CW value may be less than the target CW value. The CW calculation manager 815 may also set the new CW value as a minimum CW value. The CW calculation manager 815 may also calculate a doubled prior CW value. The CW calculation manager 815 may also set the new CW value as the doubled prior CW value or a maximum CW value if the doubled prior CW value exceeds the maximum CW value. In some examples, the determining that the prior CW value may be less than the target CW value may also include determining that a difference between the prior CW value and the target CW value exceeds a threshold. The CW calculation manager 815 may also apply a scaling factor to a difference between the target CW value and the prior CW value. The CW calculation manager 815 may also calculate the new CW value based at least in part on the scaled difference between the target CW value and the prior CW value.

In some examples, the wireless communications device 800 is a base station and the new CW may be used for transmission of a DL transmission to a UE using the shared radio frequency spectrum band. The CW calculation manager 815 may also scale the new CW value based at least in part on a number of UEs that are scheduled to attempt a UL transmissions to the base station and a total number of UEs configured to transmit using the shared radio frequency spectrum band. In some examples, the wireless communications device described above is a UE and the new CW may be used for transmission of a UL transmission to a base station using the shared radio frequency spectrum band.

Figure 9:
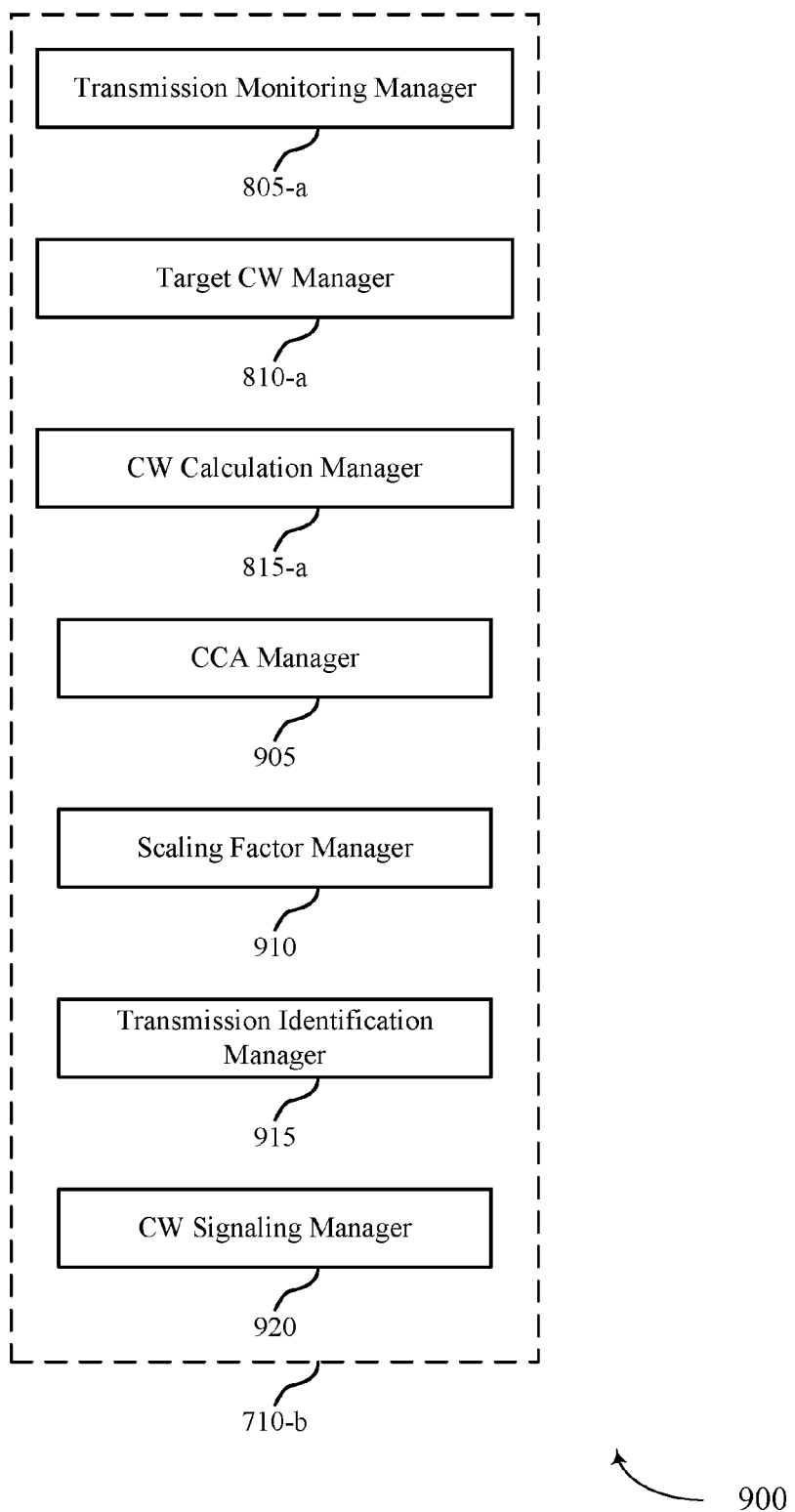
FIG. 9 shows a block diagram of a CW adjustment manager that supports CW adjustment for transmissions in a shared radio frequency spectrum band, in accordance with various aspects of the present disclosure.

FIG. 9 shows a block diagram 900 of a CW adjustment manager 710-*b* that supports CW adjustment for transmissions in a shared radio frequency spectrum band, in accordance with various aspects of the present disclosure. The CW adjustment manager 710-*b* may be an example of aspects of a CW adjustment manager 710, and may be a component of a wireless communications device 700 or a wireless communications device 800 described with reference to FIGS. 7-8. The CW adjustment manager 710-*b* may include a transmission monitoring manager 805-*a*, a target CW manager 810-*a*, and a CW calculation manager 815-*a*. Each of these components may perform the functions described with reference to FIG. 8. The CW adjustment manager 710-*b* may also include a CCA manager 905, a scaling factor manager 910, a transmission identification manager 915, and a CW signaling manager 920.

The CCA manager 905 may initiate an LBT procedure based at least in part on a new CW value as described with reference to FIGS. 1-6. The scaling factor manager 910 may be configured such that calculating a new CW value includes identifying a scaling factor for use in calculating the new CW value as described with reference to FIGS. 1-6. In some examples, the scaling factor may be determined based at least in part on one or more of a difference between a target CW and a prior CW. In some examples, a quality of service (QoS) parameter of data to be transmitted by a wireless communications device may be used in a determination of a new CW or a target CW. The scaling factor manager 910 may determine a number of nodes transmitting using the shared radio frequency spectrum band.

The transmission identification manager 915 may determine that one or more transmissions are data transmission, as described with reference to FIGS. 1-6. The transmission identification manager 915 may also increment a count of a number of transmissions following a determination of a data transmission, and may maintain the count of the number of transmissions following a determination that the transmission is not a data transmission (e.g., a determination that the transmission a control transmission).

The CW signaling manager 920 may be configured to signal a new CW value to one or more UE devices for use by the one or more UE devices in transmitting a UL transmission to a base station using the shared radio frequency spectrum band as described with reference to FIGS. 1-6.

Figure 10:
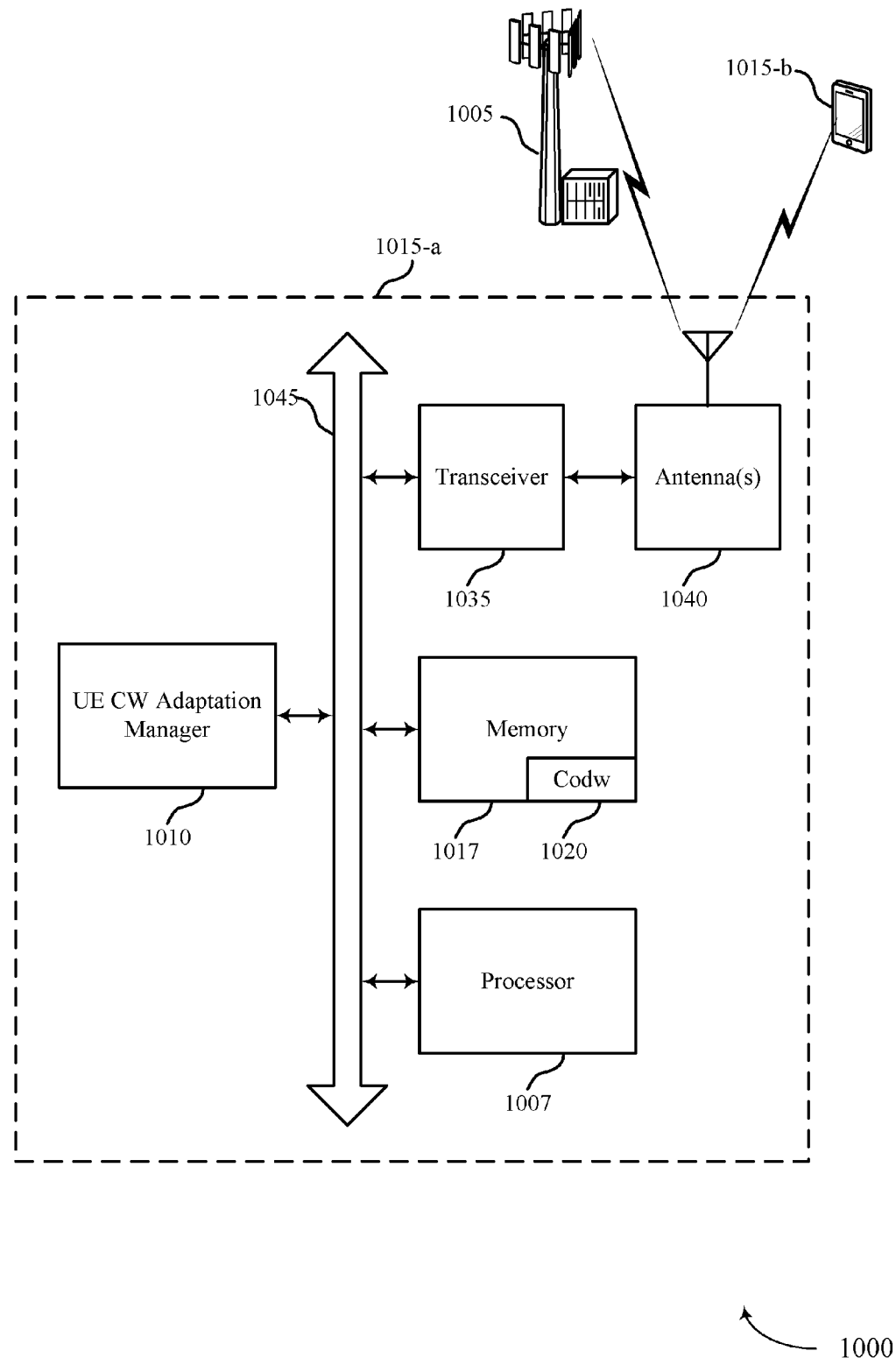
FIG. 10 illustrates a diagram of a system including a UE that supports CW adjustment for transmissions in a shared radio frequency spectrum band, in accordance with various aspects of the present disclosure.

FIG. 10 shows a diagram of a system 1000 including a UE 1015-*a* that supports CW adjustment for transmissions in a shared radio frequency spectrum band, in accordance with various aspects of the present disclosure. System 1000 may include UE 1015-*a*, which may be an example of a UE 115, 515, or 615 described with reference to FIGS. 1-6, or a wireless communications device 700 or a wireless communications device 800 described with reference to FIG. 7 or 8. UE 1015-*a* may include a UE CW adjustment manager 1010, which may be an example of a CW adjustment manager 710 described with reference to FIGS. 7-9. UE 1015-*a* may also include components for bi-directional voice and data communications including components for transmitting communications and components for receiving communications. For example, UE 1015-*a* may communicate bi-directionally with a UE 1015-*b* or a base station 1005.

UE 1015-*a* may also include a processor 1007, memory 1017 (including software/firmware code 1020), a transceiver 1035, and one or more antenna(s) 1040, each of which may communicate, directly or indirectly, with one another (e.g., via one or more buses 1045). The transceiver 1035 may communicate bi-directionally, via the antenna(s) 1040 or wired or wireless links, with one or more networks, as described herein. For example, the transceiver 1035 may support bi-directional communications with base station 1005 or UE 1015-*b*. The transceiver 1035 may include a modem to modulate the packets and provide the modulated packets to the antenna(s) 1040 for transmission, and to demodulate packets received from the antenna(s) 1040. While UE 1015-*a* may include a single antenna 1040, UE 1015-*a* may also have multiple antennas 1040 capable of concurrently transmitting or receiving multiple wireless transmissions.

The memory 1017 may include random access memory (RAM) and read only memory (ROM). The memory 1017 may store computer-readable, computer-executable software/firmware code 1020 including instructions that, when executed by the processor 1007, cause the UE 1015-*a* to perform various functions described herein (e.g., techniques for CW adjustment for transmissions in a shared radio frequency spectrum band, etc.). Alternatively, the software/firmware code 1020 may not be directly executable by the processor 1007 but cause a computer (e.g., when compiled and executed) to perform functions described herein. The processor 1007 may include an intelligent hardware device, (e.g., a central processing unit (CPU), a microcontroller, an application-specific integrated circuit (ASIC), etc.)

Figure 11:
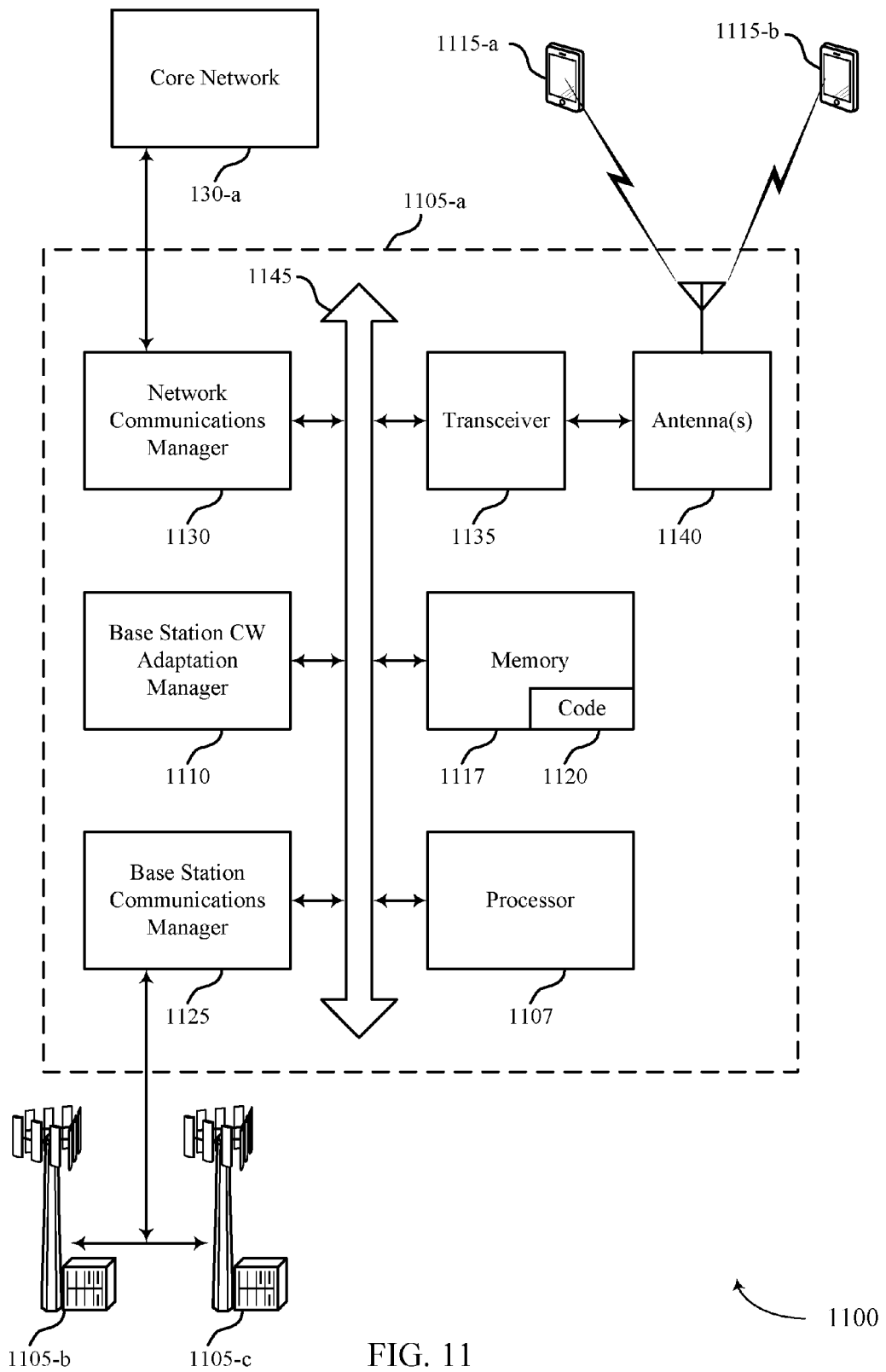
FIG. 11 illustrates a diagram of a system including a base station that supports CW adjustment for transmissions in a shared radio frequency spectrum band, in accordance with various aspects of the present disclosure.

FIG. 11 shows a diagram of a system 1100 including a base station 1105-*a* that supports CW adjustment for transmissions in a shared radio frequency spectrum band, in accordance with various aspects of the present disclosure. Base station 1105-*a* may be an example of a base station 105, 505, 605, or 1005 described with reference to FIG. 1-6 or 10, or a wireless communications device 700 or a wireless communications device 800 described with reference to FIG. 7 or 8. Base station 1105-*a* may include a base station CW adjustment manager 1110, which may be an example of a CW adjustment manager 710 described with reference to FIGS. 7-9. Base station 1105-*a* may also include components for bi-directional voice and data communications including components for transmitting communications and components for receiving communications. For example, base station 1105-*a* may communicate bi-directionally with a UE 1115-*a* or UE 1115-*b*, or other base stations 1105-*b* or 1105-*c*.

In some cases, base station 1105-*a* may have one or more wired backhaul links. Base station 1105-*a* may have a wired backhaul link (e.g., S1 interface, etc.) to a core network 130. Base station 1105-*a* may also communicate with other base stations 1105, such as base station 1105-*b* and base station 1105-*c* via inter-base station backhaul links (e.g., an X2 interface). Each of the base stations 1105 may communicate with UEs 1115 using the same or different wireless communications technologies. In some cases, base station 1105-*a* may communicate with other base stations such as 1105-*b* or 1105-*c* utilizing base station communication manager 1125. In some examples, base station communication manager 1125 may provide an X2 interface within an LTE/LTE-A wireless communication network technology to provide communication between some of the base stations 1105. In some examples, base station 1105-*a* may communicate with other base stations through core network 130. In some cases, base station 1105-*a* may communicate with the core network 130 through network communications manager 1130.

The base station 1105-*a* may include a processor 1107, memory 1117 (including software/firmware code 1120), transceiver 1135, and antenna(s) 1140, which each may be in communication, directly or indirectly, with one another (e.g., over bus system 1145). The transceivers 1135 may be configured to communicate bi-directionally, via the antenna(s) 1140, with the UEs 1115, which may be multi-mode devices. The transceiver 1135 (or other components of the base station 1105-*a*) may also be configured to communicate bi-directionally, via the antenna(s) 1140, with one or more other base stations (not shown). The transceiver 1135 may include a modem configured to modulate the packets and provide the modulated packets to the antennas 1140 for transmission, and to demodulate packets received from the antennas 1140. The base station 1105-*a* may include multiple transceivers 1135, each with one or more associated antenna(s) 1140. The transceiver may be an example of a combination of a receiver 705 and transmitter 715 described with reference to FIG. 7 or 8.

The memory 1117 may include RAM and ROM. The memory 1117 may also store computer-readable, computer-executable software/firmware code 1120 containing instructions that are configured to, when executed by the processor 1107, cause the base station 1105-*a* to perform various functions described herein (e.g., techniques for CW adjustment for transmissions in a shared radio frequency spectrum band, selecting coverage enhancement techniques, call processing, database management, message routing, etc.). Alternatively, the software/firmware code 1120 may not be directly executable by the processor 1107 but be configured to cause the computer, e.g., when compiled and executed, to perform functions described herein. The processor 1107 may include an intelligent hardware device, e.g., a CPU, a microcontroller, an ASIC, etc. The processor 1107 may include various special purpose processors such as encoders, queue processing modules, base band processors, radio head controllers, digital signal processor (DSPs), and the like.

The base station communication manager 1125 may manage communications with other base stations 1105. In some cases, a communications management manager may include a controller or scheduler for controlling communications with UEs 1115 in cooperation with other base stations 1105. For example, the base station communication manager 1125 may coordinate scheduling for transmissions to UEs 1115 for various interference mitigation techniques such as beamforming or joint transmission.

The components of wireless communications device 700, wireless communications device 800, and CW adjustment managers 710, 1010, or 1110 may, individually or collectively, be implemented with at least one ASIC adapted to perform some or all of the applicable functions in hardware. Alternatively, the functions may be performed by one or more other processing units (or cores), on at least one integrated circuit (IC). In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 12:
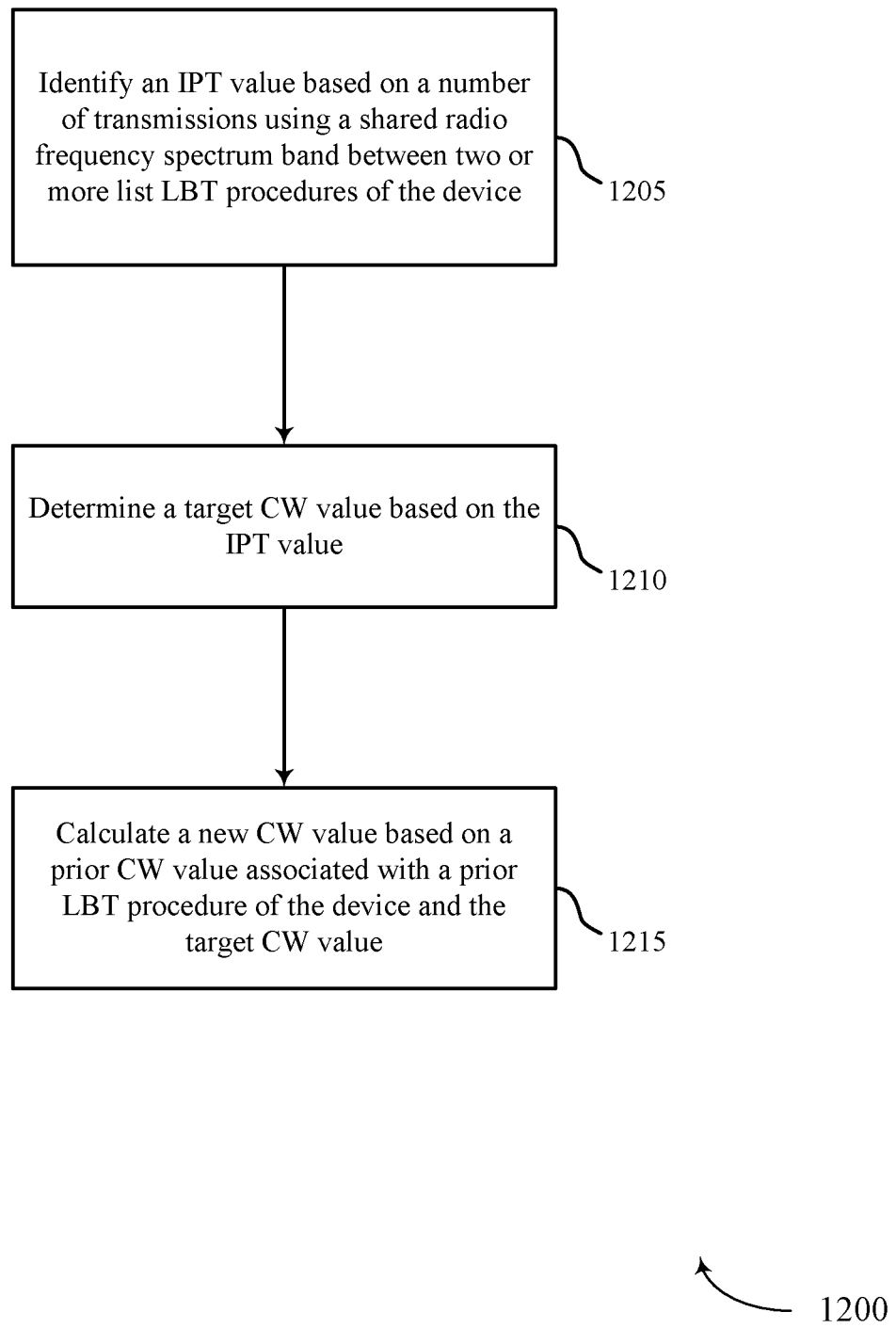
FIGS. 12-17 show flow charts illustrating methods that support CW adjustment for transmissions in a shared radio frequency spectrum band, in accordance with various aspects of the present disclosure.

FIG. 12 shows a flowchart illustrating a method 1200 that supports CW adjustment for transmissions in a shared radio frequency spectrum band, in accordance with various aspects of the present disclosure. The operations of method 1200 may be implemented by a wireless communications device, such as a UE or base station, or their components as described with reference to FIGS. 1-11. For example, the operations of method 1200 may be performed by a CW adjustment manager 710, 1010, or 1110 as described with reference to FIGS. 7-11. In some examples, a UE or base station may execute a set of codes to control the functional elements of the UE or base station to perform the functions described below. Additionally or alternatively, a UE or base station may perform aspects the functions described below using special-purpose hardware.

At block 1205, the device may identify an IPT value based at least in part on a number of transmissions using a shared radio frequency spectrum band between two or more LBT procedures of the device as described with reference to FIGS. 1-6. Operations of block 1205 may be performed by a transmission monitoring manager 805 as described with reference to FIG. 8 or 9.

At block 1210, the device may determine a target CW value based at least in part on the IPT value as described with reference to FIGS. 1-6. Operations of block 1210 may be performed by a target CW manager 810 as described with reference to FIG. 8 or 9.

At block 1215, the device may calculate a new CW value based at least in part on a prior CW value associated with a prior LBT procedure of the device and the target CW value as described with reference to FIGS. 1-6. Operations of block 1215 may be performed by a CW calculation manager 815 as described with reference to FIG. 8 or 9.

Figure 13:
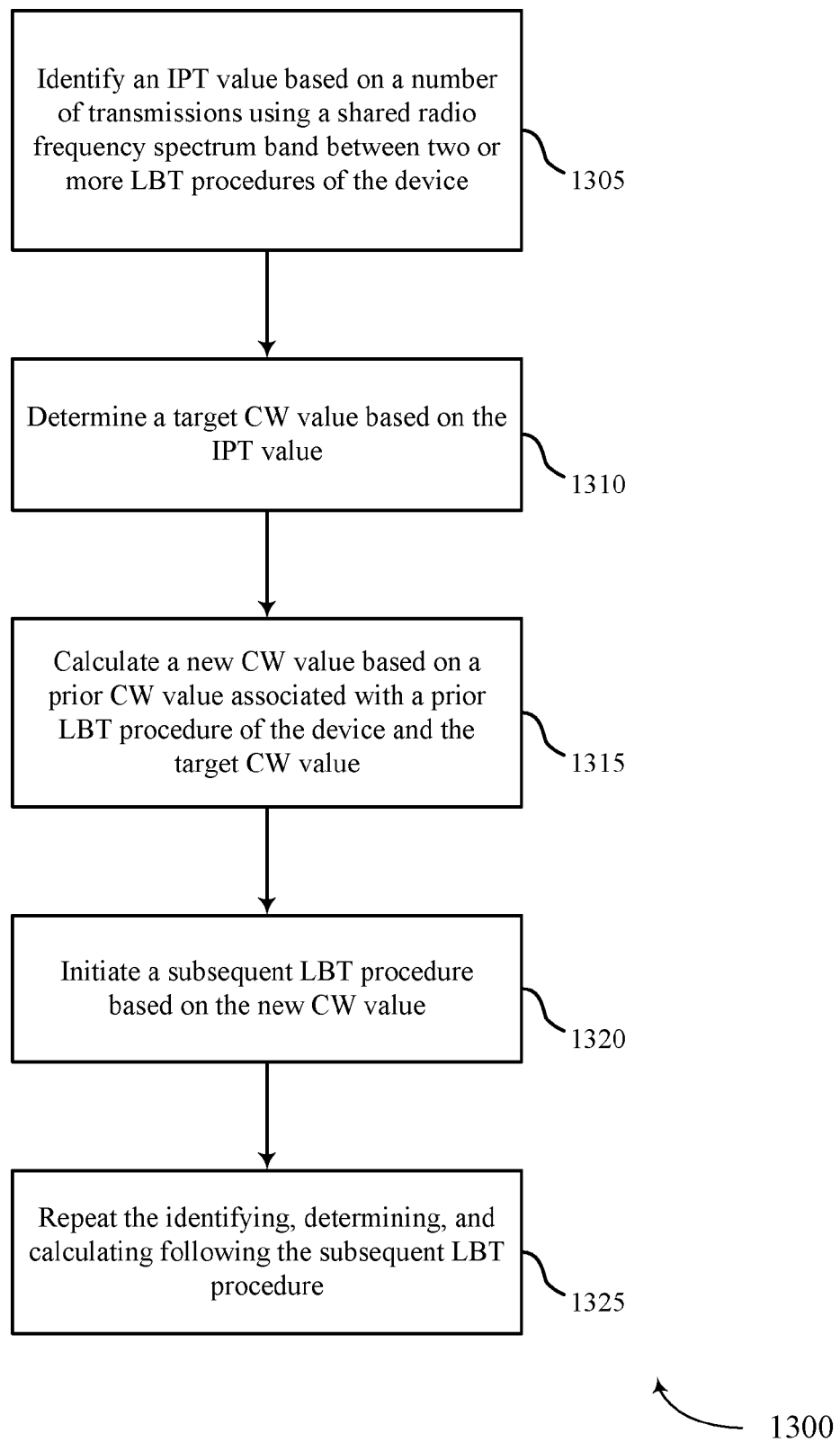

FIG. 13 shows a flowchart illustrating a method 1300 that supports CW adjustment for transmissions in a shared radio frequency spectrum band, in accordance with various aspects of the present disclosure. The operations of method 1300 may be implemented by a wireless communications device, such as a UE or base station, or their components as described with reference to FIGS. 1-11. For example, the operations of method 1300 may be performed by a CW adjustment manager 710, 1010, or 1110 as described with reference to FIGS. 7-11. In some examples, a UE or base station may execute a set of codes to control the functional elements of the UE or base station to perform the functions described below. Additionally or alternatively, a UE or base station may perform aspects the functions described below using special-purpose hardware. The method 1300 may also incorporate aspects of method 1200 described with reference to FIG. 12.

At block 1305, the device may identify an IPT value based at least in part on a number of transmissions using a shared radio frequency spectrum band between two or more LBT procedures of the device as described with reference to FIGS. 1-6. Operations of block 1305 may be performed by a transmission monitoring manager 805 as described with reference to FIG. 8 or 9.

At block 1310, the device may determine a target CW value based at least in part on the IPT value as described with reference to FIGS. 1-6. Operations of block 1310 may be performed by a target CW manager 810 as described with reference to FIG. 8 or 9.

At block 1315, the device may calculate a new CW value based at least in part on a prior CW value associated with a prior LBT procedure of the device and the target CW value as described with reference to FIGS. 1-6. Operations of block 1315 may be performed by a CW calculation manager 815 as described with reference to FIG. 8 or 9.

At block 1320, the device may initiate a subsequent LBT procedure based at least in part on the new CW value as described with reference to FIGS. 1-6. Operations of block 1320 may be performed by a CCA manager 905 as described with reference to FIG. 9.

At block 1325, the device may repeat the identifying, determining, and calculating following the subsequent LBT procedure as described with reference to FIGS. 1-6. Operations of block 1325 may be performed by a transmission monitoring manager 805, a target CW manager 810, and/or a CW calculation manager 815 as discussed above.

Figure 14:
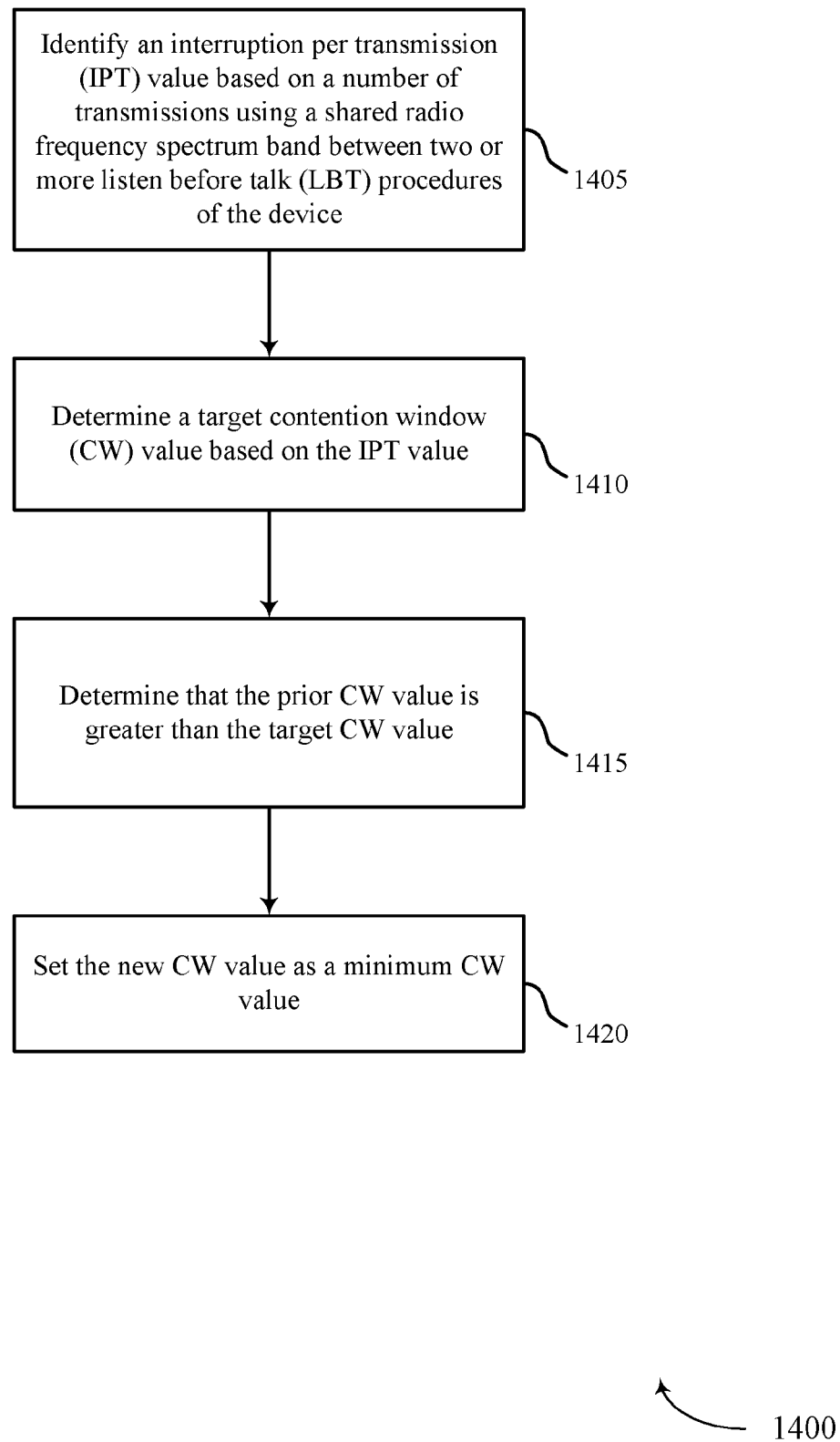

FIG. 14 shows a flowchart illustrating a method 1400 that supports CW adjustment for transmissions in a shared radio frequency spectrum band, in accordance with various aspects of the present disclosure. The operations of method 1400 may be implemented by a wireless communications device, such as a UE or base station, or their components as described with reference to FIGS. 1-11. For example, the operations of method 1400 may be performed by a CW adjustment manager 710, 1010, or 1110 as described with reference to FIGS. 7-11. In some examples, a UE or base station may execute a set of codes to control the functional elements of the UE or base station to perform the functions described below. Additionally or alternatively, a UE or base station may perform aspects the functions described below using special-purpose hardware. The method 1400 may also incorporate aspects of methods 1200, and 1300 described with reference to FIGS. 12-13.

At block 1405, the device may identify an IPT value based at least in part on a number of transmissions using a shared radio frequency spectrum band between two or more LBT procedures of the device as described with reference to FIGS. 1-6. Operations of block 1405 may be performed by a transmission monitoring manager 805 as described with reference to FIG. 8 or 9.

At block 1410, the device may determine a target CW value based at least in part on the IPT value as described with reference to FIGS. 1-6. Operations of block 1410 may be performed by a target CW manager 810 as described with reference to FIG. 8 or 9.

At block 1415, the device may determine that the prior CW value is greater than the target CW value as described with reference to FIGS. 1-6. Operations of block 1415 may be performed by a CW calculation manager 815 as described with reference to FIG. 8 or 9.

At block 1420, the device may set the new CW value as a minimum CW value as described with reference to FIGS. 1-6. Operations of block 1420 may be performed by a CW calculation manager 815 as described with reference to FIG. 8 or 9.

Figure 15:
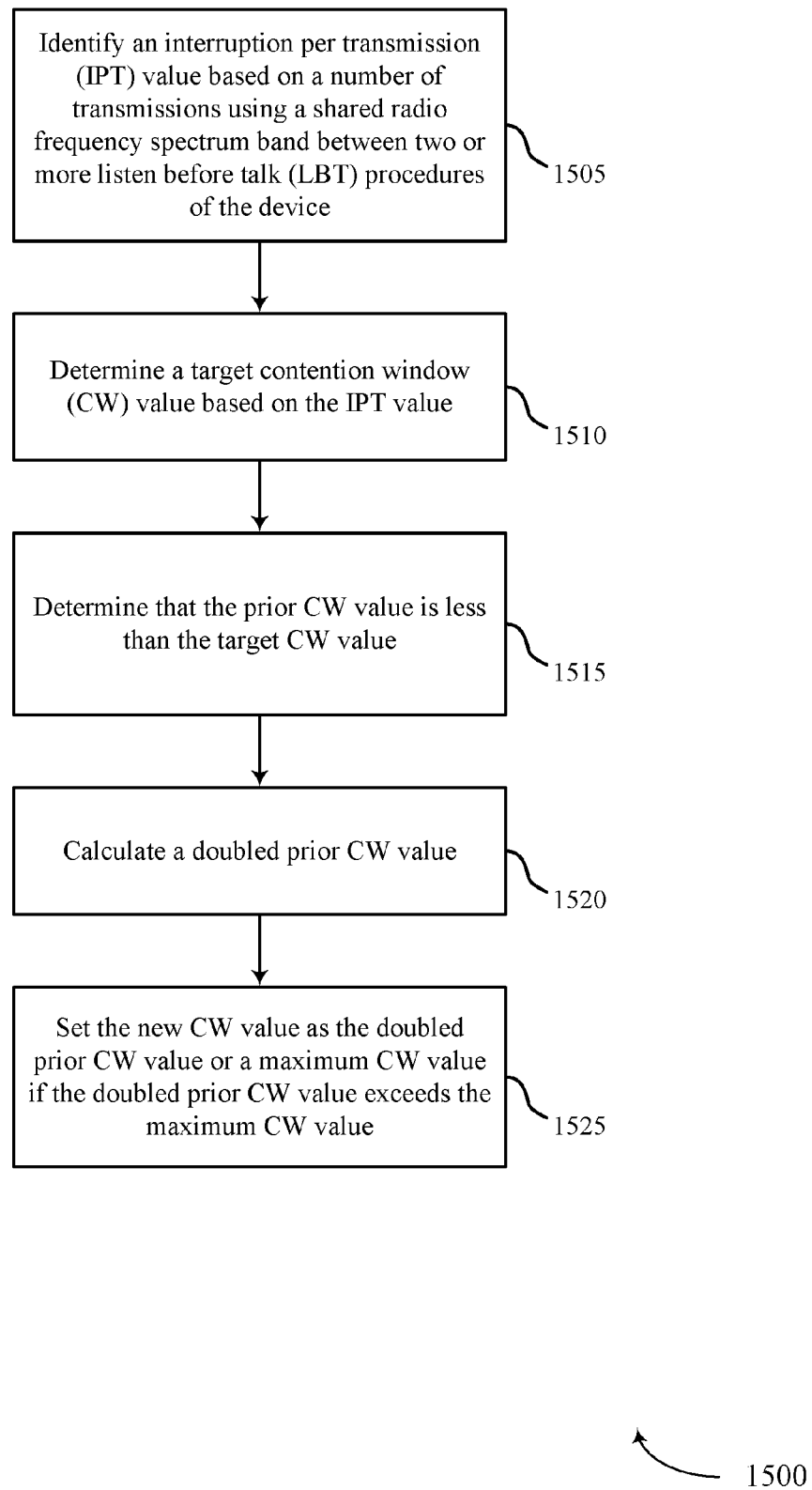

FIG. 15 shows a flowchart illustrating a method 1500 that supports CW adjustment for transmissions in a shared radio frequency spectrum band, in accordance with various aspects of the present disclosure. The operations of method 1500 may be implemented by a wireless communications device, such as a UE or base station, or their components as described with reference to FIGS. 1-11. For example, the operations of method 1500 may be performed by a CW adjustment manager 710, 1010, or 1110 as described with reference to FIGS. 7-11. In some examples, a UE or base station may execute a set of codes to control the functional elements of the UE or base station to perform the functions described below. Additionally or alternatively, a UE or base station may perform aspects the functions described below using special-purpose hardware. The method 1500 may also incorporate aspects of methods 1200, 1300, and 1400 described with reference to FIGS. 12-14.

At block 1505, the device may identify an IPT value based at least in part on a number of transmissions using a shared radio frequency spectrum band between two or more LBT procedures of the device as described with reference to FIGS. 1-6. Operations of block 1505 may be performed by a transmission monitoring manager 805 as described with reference to FIG. 8 or 9.

At block 1510, the device may determine a target CW value based at least in part on the IPT value as described with reference to FIGS. 1-6. Operations of block 1510 may be performed by a target CW manager 810 as described with reference to FIG. 8 or 9.

At block 1515, the device may determine that the prior CW value is less than the target CW value as described with reference to FIGS. 1-6. Operations of block 1515 may be performed by a CW calculation manager 815 as described with reference to FIG. 8 or 9.

At block 1520, the device may calculate a doubled prior CW value as described with reference to FIGS. 1-6. Operations of block 1520 may be performed by a CW calculation manager 815 as described with reference to FIG. 8 or 9.

At block 1525, the device may set the new CW value as the doubled prior CW value or a maximum CW value if the doubled prior CW value exceeds a maximum CW value as described with reference to FIGS. 1-6. Operations of block 1525 may be performed by a CW calculation manager 815 as described with reference to FIG. 8 or 9.

Figure 16:
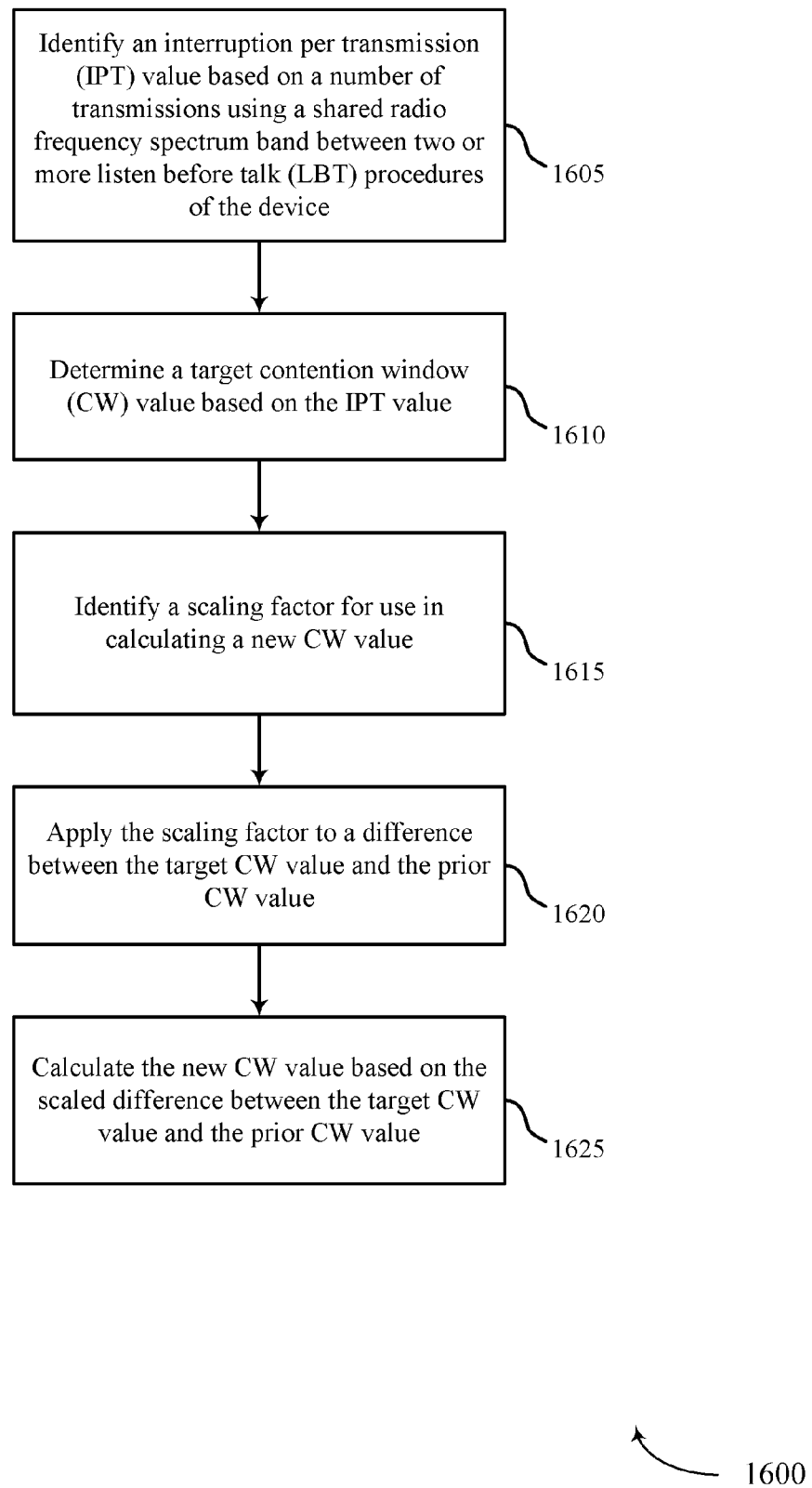

FIG. 16 shows a flowchart illustrating a method 1600 that supports CW adjustment for transmissions in a shared radio frequency spectrum band, in accordance with various aspects of the present disclosure. The operations of method 1600 may be implemented by a wireless communications device, such as a UE or base station, or their components as described with reference to FIGS. 1-11. For example, the operations of method 1600 may be performed by a CW adjustment manager 710, 1010, or 1110 as described with reference to FIGS. 7-11. In some examples, a UE or base station may execute a set of codes to control the functional elements of the UE or base station to perform the functions described below. Additionally or alternatively, a UE or base station may perform aspects the functions described below using special-purpose hardware. The method 1600 may also incorporate aspects of methods 1200, 1300, 1400, and 1500 described with reference to FIGS. 12-15.

At block 1605, the device may identify an IPT value based at least in part on a number of transmissions using a shared radio frequency spectrum band between two or more LBT procedures of the device as described with reference to FIGS. 1-6. Operations of block 1605 may be performed by a transmission monitoring manager 805 as described with reference to FIG. 8 or 9.

At block 1610, the device may determine a target CW value based at least in part on the IPT value as described with reference to FIGS. 1-6. Operations of block 1610 may be performed by a target CW manager 810 as described with reference to FIG. 8 or 9.

At block 1615, the device may identify a scaling factor for use in calculating a new CW value as described with reference to FIGS. 1-6. Operations of block 1615 may be performed by a CW calculation manager 815 as described with reference to FIG. 8 or 9.

At block 1620, the device may apply the scaling factor to a difference between the target CW value and the prior CW value as described with reference to FIGS. 1-6. Operations of block 1620 may be performed by a CW calculation manager 815 as described with reference to FIG. 8 or 9.

At block 1625, the device may calculate the new CW value based at least in part on the scaled difference between the target CW value and the prior CW value as described with reference to FIGS. 1-6. Operations of block 1625 may be performed by a CW calculation manager 815 as described with reference to FIG. 8 or 9.

Figure 17:
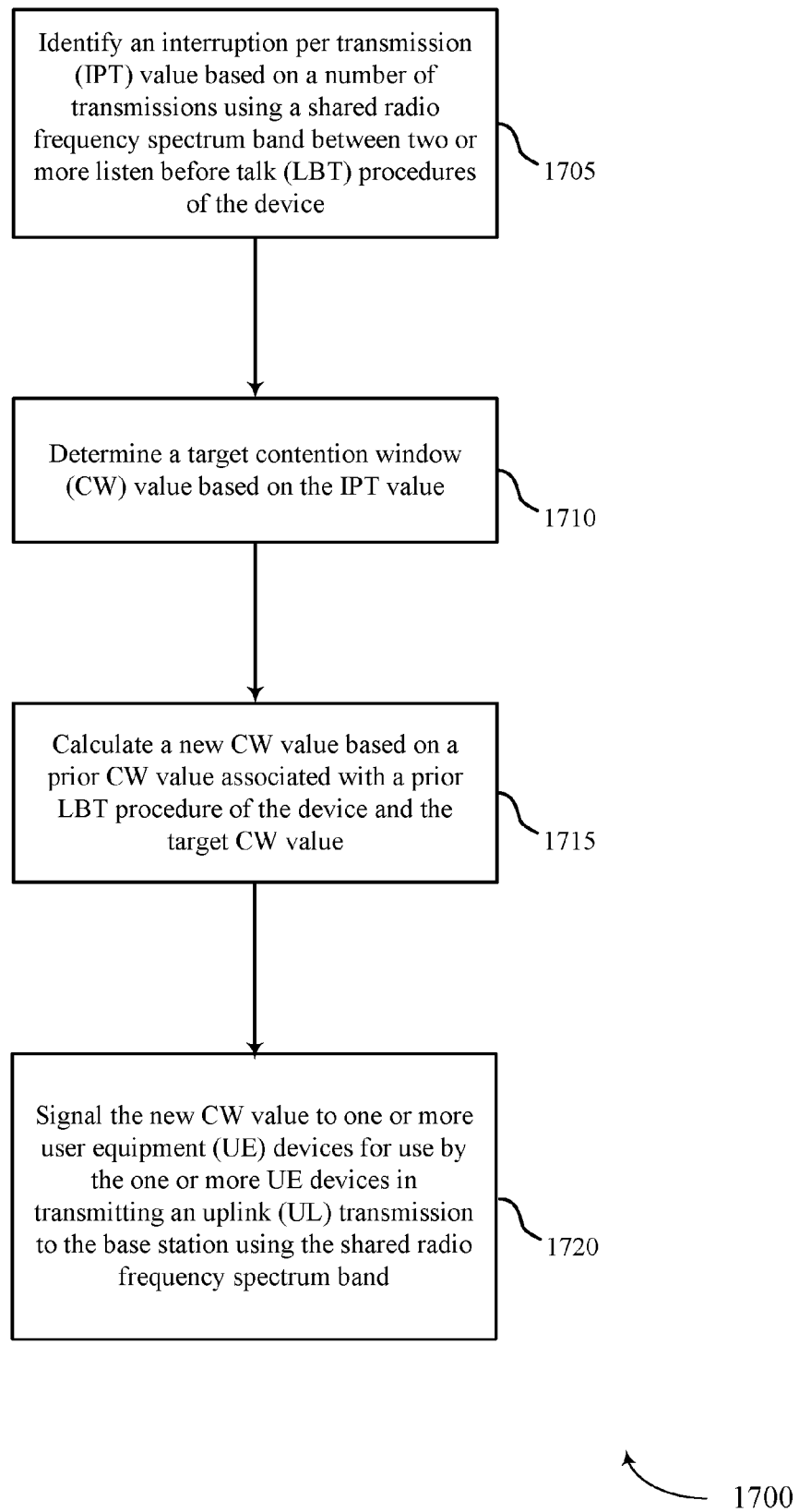

FIG. 17 shows a flowchart illustrating a method 1700 that supports CW adjustment for transmissions in a shared radio frequency spectrum band in accordance with various aspects of the present disclosure. The operations of method 1700 may be implemented by a wireless communications device, such as a base station or its components as described with reference to FIGS. 1-11. For example, the operations of method 1700 may be performed by a CW adjustment manager 710 or 1110 as described with reference to FIG. 7-9 or 11. In some examples, a base station may execute a set of codes to control the functional elements of the UE or base station to perform the functions described below. Additionally or alternatively, a base station may perform aspects the functions described below using special-purpose hardware. The method 1700 may also incorporate aspects of methods 1200, 1300, 1400, 1500, and 1600 described with reference to FIGS. 12-16.

At block 1705, the device may identify an IPT value based at least in part on a number of transmissions using a shared radio frequency spectrum band between two or more LBT procedures of the device as described with reference to FIGS. 1-6. Operations of block 1705 may be performed by a transmission monitoring manager 805 as described with reference to FIG. 8 or 9.

At block 1710, the device may determine a target CW value based at least in part on the IPT value as described with reference to FIGS. 1-6. Operations of block 1710 may be performed by a target CW manager 810 as described with reference to FIG. 8 or 9.

At block 1715, the device may calculate a new CW value based at least in part on a prior CW value associated with a prior LBT procedure of the device and the target CW value as described with reference to FIGS. 1-6. Operations of block 1715 may be performed by CW calculation manager 815 as described with reference to FIG. 8 or 9.

At block 1720, the device may signal the new CW value to one or more UE devices for use by the one or more UE devices in transmitting a UL transmission to the device using the shared radio frequency spectrum band as described with reference to FIGS. 1-6. Operations of block 1720 may be performed by a CW signaling manager 920 as described with reference to FIG. 9.

Thus, methods 1200, 1300, 1400, 1500, 1600, and 1700 may support CW adjustment for transmissions in a shared radio frequency spectrum band. It should be noted that methods 1200, 1300, 1400, 1500, 1600, and 1700 describe possible implementation, and that the operations and the steps may be rearranged or otherwise modified such that other implementations are possible. In some examples, aspects from two or more of the methods 1200, 1300, 1400, 1500, 1600, and 1700 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency-division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). 3GPP LTE and LTE-A are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-a networks, including such networks described herein, the term eNB may be generally used to describe the base stations. The wireless communications system or systems described herein may include a heterogeneous LTE/LTE-a network in which different types of eNBs provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, an eNB, a Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communication systems 100 and 200 described with reference to FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 described with reference to FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communications at a wireless communications device, comprising:
    identifying a number of transmissions using a shared radio frequency spectrum band between two or more listen-before-talk (LBT) procedures of the wireless communications device, wherein identifying the number of transmissions using the shared radio frequency spectrum band comprises:
        identifying a first transmission using the shared radio frequency spectrum band;
        determining that the first transmission is a data transmission; and
        incrementing a count of the number of transmissions following the determination that the first transmission is a data transmission;
    identifying an interruption per transmission (IPT) value based at least in part on the identified number of transmissions using the shared radio frequency spectrum band;
    determining a target contention window (CW) value based at least in part on the IPT value; and
    calculating a new CW value based at least in part on a prior CW value associated with a prior LBT procedure of the wireless communications device and the target CW value.

2. The method of claim 1, further comprising:
    initiating a subsequent LBT procedure based at least in part on the new CW value; and
    repeating the identifying, determining, and calculating following the subsequent LBT procedure.

3. The method of claim 1, wherein identifying the number of transmissions using a shared radio frequency spectrum band comprises:
    identifying transmissions using the shared radio frequency spectrum band between a first LBT procedure of the wireless communications device and a second LBT procedure of the wireless communications device.

4. The method of claim 1, wherein identifying the number of transmissions using a shared radio frequency spectrum band comprises:
averaging a plurality of identified numbers of transmissions between a plurality of LBT procedures of the wireless communications device.

5. The method of claim 1, wherein calculating the new CW value comprises:
determining that the prior CW value is greater than the target CW value; and
setting the new CW value as a minimum CW value.

6. The method of claim 1, wherein calculating the new CW value comprises:
determining that the prior CW value is less than the target CW value;
calculating a doubled prior CW value; and
setting the new CW value as the doubled prior CW value or a maximum CW value if the doubled prior CW value exceeds the maximum CW value.

7. The method of claim 6, wherein the determining that the prior CW value is less than the target CW value further comprises:
determining that a difference between the prior CW value and the target CW value exceeds a threshold.

8. The method of claim 1, wherein calculating the new CW value comprises:
identifying a scaling factor for use in calculating the new CW value;
applying the scaling factor to a difference between the target CW value and the prior CW value; and
calculating the new CW value based at least in part on the scaled difference between the target CW value and the prior CW value.

9. The method of claim 8, wherein the scaling factor is determined based on one or more of:
a difference between the target CW value and the prior CW value, a number of prior LBT procedures in which the target CW value exceeds the prior CW value, a quality of service (QoS) parameter of data to be transmitted by the wireless communications device, or a number of nodes transmitting using the shared radio frequency spectrum band, or a combination thereof.

10. The method of claim 1, wherein identifying the number of transmissions using the shared radio frequency spectrum band further comprises:
determining that a second transmission is not a data transmission; and
maintaining the count of the number of transmissions following the determination that the second transmission is not a data transmission.

11. The method of claim 1, wherein identifying the number of transmissions using the shared radio frequency spectrum band comprises:
measuring an energy level of the shared radio frequency spectrum band based at least in part on one or more of an observation slot length, an initial measurement deferral period, or a backoff period, or a combination thereof.

12. The method of claim 11, wherein a transmission is determined based at least in part on the measured energy level exceeding an energy detection threshold value.

13. The method of claim 1, wherein the wireless communications device is a base station and the new CW value is used for transmission of a downlink (DL) transmission to a user equipment (UE) using the shared radio frequency spectrum band.

14. The method of claim 1, wherein the wireless communications device is a base station, and wherein the method further comprises:
signaling the new CW value to one or more user equipment (UE) devices for use by the one or more UE devices in transmitting an uplink (UL) transmission to the base station using the shared radio frequency spectrum band.

15. The method of claim 14, further comprising:
scaling the new CW value based at least in part on a number of UEs that are scheduled to attempt a UL transmissions to the base station and a total number of UEs configured to transmit using the shared radio frequency spectrum band.

16. The method of claim 1, wherein the wireless communications device is a user equipment (UE) and the new CW value is used for transmission of an uplink (UL) transmission to a base station using the shared radio frequency spectrum band.

17. An apparatus for wireless communication at a wireless communications device, comprising:
a processor;
memory in electronic communication with the processor; and
instructions stored in the memory and operable, when executed by the processor, to cause the apparatus to:
identify a number of transmissions using a shared radio frequency spectrum band between two or more listen-before-talk (LBT) procedures of the wireless communications device, wherein identifying the number of transmissions using the shared radio frequency spectrum band comprises:
identifying a first transmission using the shared radio frequency spectrum band;
determining that the first transmission is a data transmission; and
incrementing a count of the number of transmissions following the determination that the first transmission is a data transmission;
identify an interruption per transmission (IPT) value based at least in part on the identified number of transmissions using the shared radio frequency spectrum band;
determine a target contention window (CW) value based at least in part on the IPT value; and
calculate a new CW value based at least in part on a prior CW value associated with a prior LBT procedure of the wireless communications device and the target CW value.

18. The apparatus of claim 17, wherein the instructions for identifying the number of transmissions using a shared radio frequency spectrum band are operable to cause the apparatus to:
identify transmissions using the shared radio frequency spectrum band between a first LBT procedure of the wireless communications device and a second LBT procedure of the wireless communications device.

19. The apparatus of claim 17, wherein the instructions for identifying the number of transmissions using a shared radio frequency spectrum band are operable to cause the apparatus to:
average a plurality of identified numbers of transmissions between a plurality of LBT procedures of the wireless communications device.

20. The apparatus of claim 17, wherein the instructions for calculating the new CW value are operable to cause the apparatus to:

determine that the prior CW value is greater than the target CW value; and set the new CW value as a minimum CW value.

21. The apparatus of claim 17, wherein the instructions for calculating the new CW value are operable to cause the apparatus to:

determine that the prior CW value is less than the target CW value;

calculate a doubled prior CW value; and set the new CW value as the doubled prior CW value or a maximum CW value if the doubled prior CW value exceeds the maximum CW value.

22. The apparatus of claim 17, wherein the instructions for calculating the new CW value are operable to cause the apparatus to:

identify a scaling factor for use in calculating the new CW value;

apply the scaling factor to a difference between the target CW value and the prior CW value; and calculate the new CW value based at least in part on the scaled difference between the target CW value and the prior CW value.

23. The apparatus of claim 17, wherein the instructions for identifying the number of transmissions using the shared radio frequency spectrum band are operable to cause the apparatus to:

measure an energy level of the shared radio frequency spectrum band based at least in part on one or more of an observation slot length, an initial measurement deferral period, or a backoff period, or a combination thereof.

24. The apparatus of claim 17, wherein the wireless communications device is a base station and the new CW value is used for transmission of a downlink (DL) transmission to a user equipment (UE) using the shared radio frequency spectrum band.

25. The apparatus of claim 17, wherein the wireless communications device is a base station, and wherein the instructions are operable to cause the apparatus to:

signal the new CW value to one or more user equipment (UE) devices for use by the one or more UE devices in transmitting an uplink (UL) transmission to the base station using the shared radio frequency spectrum band.

26. The apparatus of claim 17, wherein the wireless communications device is a user equipment (UE) and the new CW value is used for transmission of an uplink (UL) transmission to a base station using the shared radio frequency spectrum band.

27. An apparatus for wireless communication at a wireless communications device, comprising:

means for identifying a number of transmissions using a shared radio frequency spectrum band between two or more listen-before-talk (LBT) procedures of the wireless communications device, wherein identifying the number of transmissions using the shared radio frequency spectrum band comprises:

identifying a first transmission using the shared radio frequency spectrum band;

determining that the first transmission is a data transmission; and incrementing a count of the number of transmissions following the determination that the first transmission is a data transmission;

means for identifying an interruption per transmission (IPT) value based at least in part on the identified number of transmissions using the shared radio frequency spectrum band;

means for determining a target contention window (CW) value based at least in part on the IPT value; and means for calculating a new CW value based at least in part on a prior CW value associated with a prior LBT procedure of the wireless communications device and the target CW value.

28. A non-transitory computer-readable medium storing code for wireless communication at a wireless communications device, the code comprising instructions executable to:

identify a number of transmissions using a shared radio frequency spectrum band between two or more listen-before-talk (LBT) procedures of the wireless communications device, wherein identifying the number of transmissions using the shared radio frequency spectrum band comprises:

identifying a first transmission using the shared radio frequency spectrum band;

determining that the first transmission is a data transmission; and incrementing a count of the number of transmissions following the determination that the first transmission is a data transmission;

identify an interruption per transmission (IPT) value based at least in part on a number of transmissions using a shared radio frequency spectrum band;

determine a target contention window (CW) value based at least in part on the IPT value; and calculate a new CW value based at least in part on a prior CW value associated with a prior LBT procedure of the wireless communications device and the target CW value.

29. The apparatus of claim 17, wherein identifying the number of transmissions using the shared radio frequency spectrum band further comprises:

determining that a second transmission is not a data transmission; and maintaining the count of the number of transmissions following the determination that the second transmission is not a data transmission.

30. The apparatus of claim 27, wherein identifying the number of transmissions using the shared radio frequency spectrum band further comprises:

determining that a second transmission is not a data transmission; and maintaining the count of the number of transmissions following the determination that the second transmission is not a data transmission.

* * * * *